(12) United States Patent
Özden et al.

(10) Patent No.: US 12,037,837 B2
(45) Date of Patent: *Jul. 16, 2024

(54) FRAME SOLUTION COMPRISING COMPRESSED SUSPENSION ELEMENTS

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 520 days.

This patent is subject to a terminal disclaimer.

(21) Appl. No.: 17/422,525

(22) PCT Filed: Jan. 13, 2020

(86) PCT No.: PCT/DK2020/050010
§ 371 (c)(1),
(2) Date: Jul. 13, 2021

(87) PCT Pub. No.: WO2020/147901
PCT Pub. Date: Jul. 23, 2020

(65) Prior Publication Data
US 2022/0098867 A1    Mar. 31, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/54* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ........ E06B 3/54; E06B 3/5409; E06B 3/5454; E06B 3/5481; E06B 3/62; E06B 3/6608; E06B 3/6612; E06B 3/677
See application file for complete search history.

(56) References Cited

U.S. PATENT DOCUMENTS

| 2,595,927 | A |   | 5/1952  | Chapin |
|-----------|---|---|---------|--------|
| 2,617,159 | A | * | 11/1952 | Leighton ............... E06B 3/5409 52/204.593 |
| 2,781,561 | A |   | 2/1957  | Gifford |
| 3,686,795 | A |   | 8/1972  | La Barge |

(Continued)

FOREIGN PATENT DOCUMENTS

| CN | 2835403 Y   | 11/2006 |
| CN | 106760122 A | 5/2017  |

(Continued)

OTHER PUBLICATIONS

International Search Report for corresponding application PCT/DK2020/050008 filed Jan. 13, 2020; Mail date Apr. 3, 2020.

(Continued)

*Primary Examiner* — Ryan D Kwiecinski
(74) *Attorney, Agent, or Firm* — CANTOR COLBURN LLP

(57) ABSTRACT

The present disclosure relates to a vacuum insulated glass (VIG) unit frame assembly (10), wherein said vacuum insulated glass unit frame assembly (10) comprises: —a vacuum insulated glass unit (1), and—a frame (20) comprising elongated frame profile arrangements (20*a*-20*d*) which frames said vacuum insulated glass unit (1) in a frame opening (21). One or more of said frame profile arrange- (Continued)

Figure 1:
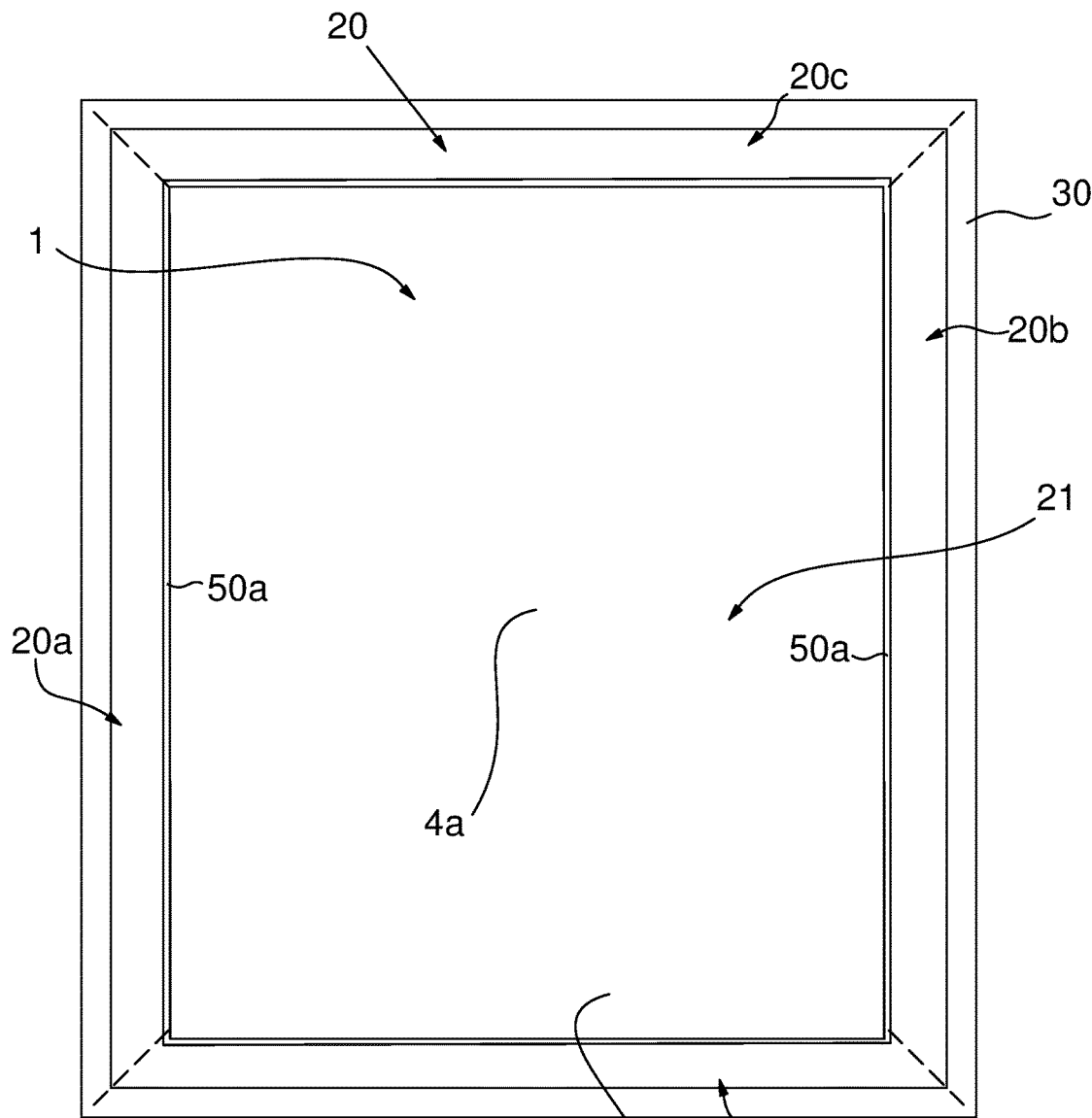

ments (20a-20d) comprises a holding part (28), wherein said holding part (28) holds the vacuum insulated glass unit (2) between first and second holding members (22, 23 28a, 28b,) arranged at opposite outwardly facing surfaces (4a, 4b, 15, 35a) of the vacuum insulated glass unit (1), and one or more resilient suspension elements (45a, 45b) is compressed between a first of said holding members (22, 23 28a, 28b) and one of said opposite outwardly facing surfaces (4a, 4b), and wherein one or more resilient suspension elements (45a, 45b) is compressed between a second of said holding members (22, 23 28a, 28b) and the other of said opposite outwardly facing surfaces (4a, 4b). Said compressed, resilient suspension elements (45a, 45b) provides a holding force (F1, F2) towards said opposite outwardly facing surfaces (4a, 4b, 15, 35a) of the vacuum insulated glass unit (1) so as to suspend the vacuum insulated glass unit (1) between said first and second holding members (28a, 28b), and each of said compressed, resilient suspension elements (45a, 45b) are configured to be further compressed or expand in response to a thermal deflection of the edge (8a-8d) of the VIG unit (1) due to a temperature difference (ΔT=71−72) between the two glass sheets (2a, 2b). The disclosure additionally relates to a vacuum insulated glass unit and a retrofitting frame system.

19 Claims, 17 Drawing Sheets

(30) Foreign Application Priority Data

| | | |
|---|---|---|
| Jan. 14, 2019 | (DK) | PA201970022 |
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| | |
|---|---|
| *E04D 13/035* | (2006.01) |
| *E06B 3/02* | (2006.01) |
| *E06B 3/14* | (2006.01) |
| *E06B 3/56* | (2006.01) |
| *E06B 3/62* | (2006.01) |
| *E06B 3/66* | (2006.01) |
| *E06B 3/67* | (2006.01) |
| *E06B 3/677* | (2006.01) |
| *E06B 7/23* | (2006.01) |

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(56) References Cited

U.S. PATENT DOCUMENTS

| | | | |
|---|---|---|---|
| 3,861,085 A | 1/1975 | Jacob | |
| 4,134,234 A | 1/1979 | Auger | |
| 4,134,238 A * | 1/1979 | Auger | E06B 3/5409 52/656.5 |
| 5,216,855 A | 6/1993 | Richter | |
| 5,373,672 A | 12/1994 | Schulz | |
| 6,263,623 B1 | 7/2001 | Weiss | |
| 6,295,774 B1 | 10/2001 | Lindgren | |
| 6,435,360 B1 | 8/2002 | Anin | |
| 7,950,192 B2 * | 5/2011 | Glover | B29C 66/72523 52/204.593 |
| 8,181,405 B2 * | 5/2012 | Nash | E04F 11/1851 52/800.18 |
| 9,447,627 B2 | 9/2016 | Thompson | |
| 10,597,933 B2 * | 3/2020 | Abe | E06B 3/6612 |
| 10,919,236 B2 * | 2/2021 | Vaccari | E06B 3/5454 |
| 11,060,341 B1 * | 7/2021 | Sprague | E06B 3/549 |
| 11,285,703 B2 * | 3/2022 | Jørgensen | B32B 41/00 |
| 11,802,435 B2 * | 10/2023 | Özden | E06B 3/677 |
| 2007/0032972 A1 | 2/2007 | Glover | |
| 2009/0324858 A1 * | 12/2009 | Jaeger | E06B 3/6612 156/107 |
| 2012/0137607 A1 | 6/2012 | Kristensen | |
| 2013/0101759 A1 | 4/2013 | Jones | |
| 2014/0007396 A1 | 1/2014 | Jones | |
| 2014/0069034 A1 * | 3/2014 | Jones | E06B 3/585 52/204.593 |
| 2015/0345207 A1 | 12/2015 | Thompson | |
| 2017/0002599 A1 * | 1/2017 | Thompson | E06B 3/5454 |
| 2022/0065026 A1 * | 3/2022 | Özden | E06B 3/6612 |

FOREIGN PATENT DOCUMENTS

| | | | |
|---|---|---|---|
| DE | 3202639 A1 | 8/1983 | |
| DE | 102006020455 A1 | 6/2007 | |
| DE | 202009016113 U1 | 5/2011 | |
| DE | 10201400186 A1 | 2/2016 | |
| EP | 0418461 A1 | 3/1991 | |
| EP | 0421239 A2 | 4/1991 | |
| EP | 0472109 A2 | 2/1992 | |
| EP | 1298100 A1 | 4/2003 | |
| EP | 1908914 A1 | 4/2008 | |
| EP | 2169172 A2 | 3/2010 | |
| EP | 2921632 A1 | 9/2015 | |
| EP | 3101195 A1 | 12/2016 | |
| EP | 3124733 A1 | 2/2017 | |
| EP | 3170799 A1 | 5/2017 | |
| FR | 2514057 A1 | 4/1983 | |
| FR | 2823789 A1 | 10/2002 | |
| FR | 2942843 A1 | 9/2010 | |
| FR | 3075245 A1 * | 6/2019 | E06B 3/5454 |
| GB | 2264742 A * | 9/1993 | E06B 3/5481 |
| GB | 2492380 A | 1/2013 | |
| GB | 2521419 A | 6/2015 | |
| JP | 2000064732 A * | 2/2000 | E06B 3/6205 |
| JP | 2000064732 A | 2/2000 | |
| JP | 2001146881 A | 5/2001 | |
| JP | 2002021437 A | 1/2002 | |
| JP | 2007132637 A | 5/2007 | |
| KR | 20180128659 A | 12/2018 | |
| WO | WO-2011048559 A1 * | 4/2011 | E04B 2/7401 |
| WO | 2014039642 A1 | 3/2014 | |
| WO | 2014183606 A1 | 11/2014 | |
| WO | WO-2014183606 A1 * | 11/2014 | E06B 3/6621 |
| WO | 2015183863 A1 | 12/2015 | |
| WO | 2017210701 A1 | 12/2017 | |
| WO | WO-2021228713 A1 * | 11/2021 | E04D 13/03 |

OTHER PUBLICATIONS

International Search Report for corresponding application PCT/DK2020/050009 filed Jan. 13, 2020; Mail date Mar. 30, 2020.

(56) References Cited

OTHER PUBLICATIONS

International Search Report for corresponding application PCT/DK2020/050010 filed Jan. 13, 2020; Mail date Mar. 25, 2020.
International Search Report for corresponding application PCT/DK2020/050011 filed Jan. 13, 2020; Mail date Apr. 7, 2020.
International Search Report for corresponding application PCT/DK2020/050012 filed Jan. 13, 2020; Mail date Apr. 9, 2020.
International Search Report for corresponding application PCT/DK2020/050013 filed Jan. 13, 2020; Mail date Mar. 19, 2020.
International Search Report for corresponding application PCT/DK2020/050014 filed Jan. 13, 2020; Mail date Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; Mail date Apr. 1, 2020.
International Search Report for corresponding application PCT/DK2020/050017 filed Jan. 13, 2020; Mail date Feb. 18, 2020.
International Search Report for corresponding application PCT/DK2020/050018 filed Jan. 13, 2020; Mail date Feb. 18, 2020.
Written Opinion for corresponding application PCT/DK2020/050008 filed Jan. 13, 2020; Mail date Apr. 3, 2020.
Written Opinion for corresponding application PCT/DK2020/050009 filed Jan. 13, 2020; Mail date Mar. 30, 2020.
Written Opinion for corresponding application PCT/DK2020/050010 filed Jan. 13, 2020; Mail date Mar. 25, 2020.
Written Opinion for corresponding application PCT/DK2020/050011 filed Jan. 13, 2020; Mail date Apr. 7, 2020.
Written Opinion for corresponding application PCT/DK2020/050012 filed Jan. 13, 2020; Mail date Apr. 9, 2020.
Written Opinion for corresponding application PCT/DK2020/050013 filed Jan. 13, 2020; Mail date Mar. 19, 2020.
Written Opinion for corresponding application PCT/DK2020/050014 filed Jan. 13, 2020; Mail date Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; Mail date Apr. 1, 2020.
Written Opinion for corresponding application PCT/DK2020/050017 filed Jan. 13, 2020; Mail date Feb. 18, 2020.
Written Opinion for corresponding application PCT/DK2020/050018 filed Jan. 13, 2020; Mail date Feb. 18, 2020.

* cited by examiner

Fig. 11B-B

FRAME SOLUTION COMPRISING COMPRESSED SUSPENSION ELEMENTS

A vacuum insulated glass (VIG) unit frame assembly, a retrofitting system for retrofitting a vacuum insulated glass unit to a frame, a method of retrofitting a vacuum insulated glass unit to a frame, and a vacuum insulated glass unit.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a part of the frame.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple and/or, mechanical solution for holding a VIG unit in/at a frame, provide a solution that may be used under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences ΔT between the VIG unit glass sheets due to the good insulation capabilities of the VIG unit. As the edge seal for sealing the gap between the VIG unit glass sheets is normally very stiff in nature, the temperature difference ΔT between the glass sheets causes the VIG unit to deflect (also known as thermal bending, thermal deflection or thermal distortion), as the hotter glass sheet of the VIG unit will expand compared to the colder of the glass sheets.

Especially VIG units according to aspects of the present disclosure may provide a $U_g$-value below 0.7 W/(m$^2$K), such as below 0.6 W/(m$^2$K), e.g. below 0.5 W/(m$^2$K) such as below 0.4 W/(m$^2$K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps)
- By providing a Hybrid VIG unit.

The present disclosure relates to a vacuum insulated glass (VIG) unit frame assembly, wherein the vacuum insulated glass unit frame assembly comprises:
- a rectangular vacuum insulated glass unit comprising at least two glass sheets separated by a gap between said glass sheets, wherein a plurality of support structures are distributed in said gap and wherein said gap is sealed, and
- a frame comprising elongated frame profile arrangements which frames said vacuum insulated glass unit in a frame opening.

one or more of said frame profile arrangements comprises a holding part, wherein said holding part holds the vacuum insulated glass unit between first and second holding members arranged at opposite outwardly facing surfaces of the vacuum insulated glass unit.

One or more resilient suspension elements is compressed between a first of said holding members and one of said opposite outwardly facing surfaces, and wherein one or more resilient suspension elements is compressed between a second of said holding members and the other of said opposite outwardly facing surfaces.

Said compressed, resilient suspension elements provides a holding force towards said opposite outwardly facing surfaces of the vacuum insulated glass unit so as to suspend the vacuum insulated glass unit between said first and second holding members, and each of said compressed, resilient suspension elements are configured to be further compressed or expand in response to a thermal deflection of the edge of the VIG unit due to a temperature difference between the two glass sheets.

The edges of the VIG unit thermally deflect over time due to a temperature difference between the VIG unit glass sheets. This temperature difference may change over time, and may induce varying stress conditions in the VIG unit. A temperature difference between the VIG unit glass sheets may provide the thermal deflection of the VIG unit edges, and the amount of thermal deflection is dependent on the size of the temperature difference $\Delta T=T1-T2$, where T1 is the temperature of one VIG unit glass sheet, and the temperature T2 is the temperature of the other VIG unit glass sheet. The operational sign of the resulting temperature difference $\Delta T$ determines to which side of the VIG unit frame assembly thermally deflects.

The thermal deflection VIG unit's edges is provided relative to a frame opening plane defined between said frame profile arrangements due to the temperature difference, in a direction perpendicular to the frame opening plane.

The present inventors have in steady state simulations of a rectangular VIG unit's thermal deflection seen that the VIG edges tend to describe an "edge deflection curve" when the VIG unit is subjected to temperature differences, and this may be caused by the properties of the VIG unit such as the rigidity of the edge sealing solution for sealing the VIG gap along the edges of the VIG unit. Tests confirmed that such edge deflection curves occur when the VIG unit is subjected to temperature differences.

The simulations indicate that an inappropriate constraining of the VIG unit's thermal deflection along/at the VIG unit edges by the frame assembly may induce a larger stress at the VIG unit edges or corner areas, such as in an edge sealing the VIG unit gap of the VIG unit at the glass sheet edges. This may increase the risk that the VIG unit is damaged over time, so that the reduced pressure in the gap of the VIG unit is released to be that of the ambient pressure of the VIG unit, and this requires a replacement of the entire VIG unit.

At the same time, the VIG unit should be kept sufficiently in the frame assembly so that it does not permanently displace to an undesired position due to gravity or outer forces such as wind gusts (in case it is e.g. used for a door or a window), hails or other objects such as birds, balls or the like provides impacts such as sudden impacts on the VIG unit surface.

The suspension elements provides a fixation of the VIG unit in the frame, and may in one or more aspects of the present disclosure either adhere to the VIG unit and/or the holding members, may alone fixate the VIG unit by means of said holding forces and/or be placed in a recess dedicated to keeping the suspension elements in a desired position.

The first and second compressed resilient suspension elements are partly pre-compressed between the holding members and the opposite outwardly facing surfaces of the vacuum insulated glass unit, and this enables the suspension elements to expand to be less compressed or be further compressed in response to the thermal deflection of the VIG unit edge as the temperature difference varies. This allows the edges of the VIG unit to thermally deflect, but also provides a holding force towards the opposite outwardly facing surfaces of the vacuum insulated glass unit. This may e.g. help to reduce stress conditions in the VIG unit and hence help to improve the lifetime of the VIG unit frame assembly, and/or help to provide a solution that may be used in varying conditions such as in varying climatic conditions.

It is understood that the sum of the compression of the first and second resilient suspension elements at the same area or point of the VIG unit edge may remain substantially unchanged when the thermal deflection changes, since, when the VIG unit thermally deflect in one direction, one of the suspension elements is compressed, but the other gasket at the same position of the VIG unit edge expands substantially correspondingly.

In one or more aspects of the present disclosure, the sum ($\Sigma \Delta H$) of the compression of said resilient suspension elements perpendicularly to the outwardly facing surfaces of the vacuum insulated glass unit is at least 3 mm, such as at least 5 mm, such as at least 7 mm, at least at one position along an outer circumference of the vacuum insulated glass unit.

This may e.g. help to provide a sufficient holding force due to the resiliency of the suspension element material, and/or help to provide a sufficient working range for the suspension element(s) during the thermal deflection of the VIG unit. This may also in further aspects of the present disclosure apply for the suspension elements at any point of the VIG unit. In aspects where the suspension elements are elongated, they may help to provide a tightening between the frame and the VIG unit, to obtain a sufficient water or air tightening.

In one or more aspects of the present disclosure, the magnitude of said thermal deflection is configured to vary along one or more of the vacuum insulated glass unit edges between the corners where the respective edge terminates, due to said temperature difference between the two glass sheets, and Wherein said compression of the resilient suspension elements is configured to vary correspondingly in the longitudinal direction of the respective edge.

This may help to provide an improved fixation of the VIG unit in a frame, where the VIG unit edge is allowed to deflect when subjected to varying temperature differences between the glass sheets of the VG unit. For example, it may help to reduce stress conditions in the VIG unit edge.

The magnitude of the thermal deflection of the respective VIG unit edge may e.g. be determined relative to a frame opening plane extending in said frame opening between the elongated frame profile arrangements due to the temperature difference. The VIG unit edges may thus describe a "deflection curve", and the compressed resilient suspension elements are configured to follow/adapt to this deflection curve by either expanding or be further compressed.

This may provide that the compression of one of the resilient suspension elements may become larger near the corner where the respective VIG edge terminates, than the compression of the same (or another) resilient suspension element at the same side of the VIG, but at another a position closer to the centre of the respective edge. In the same way, the other suspension element(s) at the other side of the VIG unit may simultaneously become less compressed near the corner where the same VIG edge terminates, and become more compressed at a position closer to the centre, such as substantially at the centre of the respective edge.

In one or more aspects of the present disclosure, the compression and expansion of the resilient suspension elements at the ⅛, such as the 1/10, such as 1/12 of the length of the vacuum insulated glass unit edge nearest a corner where the respective edge terminates, may be configured to be larger than the compression and expansion, respectively, of the same resilient suspension elements at a position closer to the centre of the respective edge.

In one or more aspects of the present disclosure, said resilient suspension elements, may have a height of at least 8 mm such as at least 10 mm, for example at least 12 mm in an uncompressed state. This may help to provide a solution where a sufficient tightening between the VIG unit and the frame assembly may be provided, and/or help to provide a suspension solution that may sufficiently adapt to the thermal deflection of the VIG unit.

In one or more aspects of the present disclosure, said resilient suspension elements have a height of between 7 mm and 30 mm, such as between 8 mm and 20 mm, e.g. between 10 mm and 16 mm in an uncompressed state.

In one or more aspects of the present disclosure, the compressed, resilient suspension elements arranged at one or both surfaces of said vacuum insulated glass unit (1), is/are subjected to a compression of at least 2 mm, such as at least 3 mm e.g. at least 4 mm perpendicularly to the outwardly facing surfaces of the vacuum insulated glass unit at least at one position along an outer circumference of the vacuum insulated glass unit at a temperature difference between the two glass sheets of substantially 0° C.

This may e.g. allow one of the resilient suspension elements to sufficiently expand and thus follow the VIG deflections when the other suspension element is further compressed due to a thermal deflection, and/or help to provide a sufficient holding force from the suspension elements.

This may also in further aspects of the present disclosure apply for the suspension elements at any point of the VIG unit.

In one or more aspects of the present disclosure, one or both of said resilient suspension elements may be subjected to a compression between 2 mm and 25 mm, such as between 3 mm and 15 mm, such as between 4 mm and 8 mm, at least at one position, such as at any point of the gaskets, at a temperature difference between the two glass sheets of substantially 0° C.

In one or more aspects of the present disclosure, the difference in said compression of said resilient suspension elements arranged at opposite sides of the VIG unit at substantially any position along the VIG unit edge may be configured to be less than 20%, such as less than 10%, such as no more than 5%, or no more than 1%, at a temperature difference ($\Delta T=T1-T2$) between the two glass sheets (2a, 2b) of substantially 0° C.

This may e.g. help to provide aesthetic advantages and/or help to provide a more space saving solution. Also, or alternatively, it may help to provide an improved control of the thermal deflection of the VIG unit in the frame.

This may be determined at a plurality of positions along the VIG unit edge, but should preferably be compared for the suspension elements along a line extending perpendicular to the longitudinal direction of the respective VIG unit edge. This may apply in a situation where the VIG unit is either arranged substantially vertically and/or where the VIG unit is either arranged substantially horizontally so that gravity forces the VIG unit towards one of said first and second gaskets. And also, it is understood that this may apply when no external forces/loads acts on the VIG unit.

The suspension elements arranged at the opposite outwardly facing surfaces of the VIG unit may in one or more aspects, in an uncompressed state have a substantially similar uncompressed height, width and/or cross sectional shape, may be made from the same material, and/or may have substantially the same density and/or elastic modulus/modulus of elasticity properties.

In one or more aspects of the present disclosure, one or both of said resilient suspension elements may be elongated gasket strips arranged to extend in a direction parallel to an edge of the vacuum insulated glass unit. This may e.g. help to provide an improved force distribution when the VIG unit is suspended between the compressed, resilient suspension elements and/or help to provide an improved air and/or water tightening between the VIG unit and the frame and/or a hood heat insulation.

In aspects of the present disclosure, the suspension elements may even be substantially unbroken or continuous around the entire VIG unit a frame part and the VIG unit, thus providing an efficient water, such as rain water or condense water seal and/or an advantageous heat insulation.

In one or more aspects of the present disclosure, said resilient suspension elements may comprise a plurality of discrete suspension elements arranged at one or both sides of the vacuum insulated glass unit so as to suspend the VIG unit between said holding members. These discrete suspension elements may be discretely distributed along the same edge of the VIG unit, such as long edges of the VIG unit, and may e.g. help to provide a mechanically simple solution for controlling the thermal deflection of the VIG unit edge along the VIG unit edge, e.g. to allow a larger thermal deflection at certain positions of the respective edge, such as at centre positions and/or corner positions of the edge, and at such certain positions, the discrete resilient suspension elements may be omitted so that a space is placed at these positions.

In one or more aspects of the present disclosure, the distance between said holding members (28a, 28b) may be configured to vary less than 8%, such as less than 5%, such as less than 1% when the resilient suspension elements expands or are further compressed by the vacuum insulated glass unit when said temperature difference between the two glass sheets changes.

This may e.g. help to provide a good control of the positioning of the VIG unit between the holding members, and/or help to assist in a controlled thermal bending/deflection of the VIG unit. It may also or alternatively help to improve the aesthetic appearance of the VIG unit frame assembly.

In one or more aspects of the present disclosure, the distance between the holding members is configured to be allowed to vary in response to the thermal deflection, such as between 0.1% and 10%, e.g. between 0.5% and 8%, such as between 0.1% and 4%, for example between 0.5% and 3% of the distance between the holding members when the temperature difference $\Delta T$ between the two glass sheets is substantially 0° C. But the distance it may also in further aspects of the present disclosure be substantially constant at least when the temperature difference is above 20° C. or 30° C. such as above 40° C., such as around 65° C. It is understood that the degree of change in the distance between holding members in aspects of the present disclosure may vary in the longitudinal direction of the holding embers in response to e.g. a change in the magnitude of the thermal deflection of the VIG unit along the edge of the VIG unit, so that a change in the distance between holding members is larger at certain areas of the VIG unit edge compared to other areas of the VIG unit edge. For example, the largest degree of change in the distance between the holding members may be largest at the ⅐ of the length of the VIG unit edge nearest the corner of the respective VIG unit edge, and/or around/at the centre area of the VIG unit edge.

In one or more aspects of the present disclosure, said frame assembly may comprise substantially parallel top and bottom frame profile arrangements, and substantially parallel side profile frame arrangements, wherein two, three or all of said top, bottom and/or side profile frame arrangements at least partly, such as fully, encloses said edges such as in a recess, and wherein two or more of said frame profile arrangements comprises one or more of said holding part.

This may e.g. provide advantages such as a mechanically simple solution for achieving one or more of the above mentioned effects such as an allowed thermal deflection of the VIG unit edge and thus a reduced stress condition at certain areas of the VIG unit.

The bottom frame profile arrangement may be of a different design/constitution than the side and top profile frame arrangements, at least of the frame assembly is a building aperture cover, as it may e.g. comprise a water drainage system for draining water from the surface of the vacuum insulated glass (VIG) unit away from the vacuum insulated glass (VIG) unit frame assembly which drainage system may not be present at the side and top profile frame arrangements.

In one or more aspects of the present disclosure, two or more of said top, bottom or side frame profile arrangements each comprise a holding part, which holds the vacuum insulated glass unit between two holding members as described e.g. above or below. For example side frame profile arrangements may both comprise a holding part, and the same may the top profile frame arrangement and/or bottom profile frame arrangement.

In one or more aspects of the present disclosure, the corners and/or the centre portion of the vacuum insulated glass unit's edges are configured to provide said thermal deflection in between and relative to said holding members.

This may e.g. help to provide a good control of the thermal edge deflection, help to provide a space saving frame solution and/or help to provide aesthetic advantages. The deflections of the corners and centre portion of the same edge may be provided in different directions from the previously mentioned frame opening plane, and in the space between the holding members.

In one or more aspects of the present disclosure said holding members are elongated walls integrated in and part of a frame profile connecting said elongated walls by means of a connection wall, wherein the connection wall extends between said elongated walls to provide a recess, such as a U-shaped recess receiving the edge of the vacuum insulated glass unit.

These profiles such as the profile with the integrated walls, and/or the base member and glazing member may in embodiments of the present disclosure either be moulded, extruded or pultruded.

The elongated walls extends in the longitudinal direction of the VIG edge proximate the holding members.

This may e.g. provide a cost efficient solution and/or help to provide a solution where a fast and/or reliable manufacturing may be obtained.

The material of the profile(s) may e.g. be a plastic material such as a PVC material, it may be composite material such as a glass or carbon fibre material, the profiles may be made from a plastic material with fibres embedded to obtain a more strong/rigid profile and/or the like. Also, in one or more aspects the profiles of the frame may be made from a metal such as aluminium.

These profiles may in aspects of the present disclosure extend continuously between the corners of the frame in the longitudinal direction of the VIG edge.

In one or more other aspects of the present disclosure, one or both of said holding members may be provided by a releasable glazing member and a base member to which the glazing member is attached.

The holding members and the connection wall may together provide a U-shaped recess into which the edge of the vacuum insulated glass unit extend.

In one or more aspects, said vacuum insulated glass unit is a laminated vacuum insulated glass unit, where a lamination glass sheet, such as an annealed glass sheet, is laminated to an outer major surface of a glass sheet of the vacuum insulated glass unit by means of a lamination layer.

Simulation results have indicated that even though a lamination glass sheet may help to restrict the thermal deflection of the VIG unit edges with between 30% and 60% compared to free deflection where the lamination glass sheet is not present. However, it may still be relevant to allow said edge deflection in the frame, as stresses such as tensile stresses in the VIG unit glass sheets and/or the edge sealing may still become significant during thermal deflection. Hence, the combination of a laminated glass sheet with the present solution comprising the suspension elements may provide a long lasting VIG unit that may be subjected to varying temperature differences over time without being subjected to damaging fatigue in the VIG unit.

In one or more aspects of the present disclosure, one or both of the VIG unit glass sheet enclosing the evacuated gap may be tempered glass sheets, e.g. thermally tempered glass sheets. A tempered glass sheet may provide increased safety and/or strength of the VIG unit. In other aspects of the present disclosure, at least one of said glass sheets of the VIG unit may be an annealed glass sheet.

In one or more aspects of the present disclosure, said suspension elements may provide the fixation of the vacuum insulated glass unit in said frame at opposite, outer surfaces of the vacuum insulated glass unit along and opposite to an edge seal of said vacuum insulated glass unit which seals the gap between the VIG unit glass sheets.

At least a part of the edge seal is thus provided between the locations where the suspension elements provides fixation/holding of the VIG unit by a clamping force. Hence, when outer forces strikes the VIG unit, the forces are transferred to the frame assembly at a location where the edge seal of the VIG unit is placed.

This may e.g. help to reduce or avoid a compression force caused by the compressed gaskets to be subjected to support structures in the gap of the VIG unit, and/or help to provide a VIG unit frame assembly which may be less likely to break. In further aspects of the present disclosure, said suspension elements may provide fixation/holding of the VIG unit by a clamping force at locations opposite to the evacuated gap of the VIG unit, and may thus be arranged away from the VIG edge seal and thus not be placed opposite to the edge seal.

In one or more aspects of the present disclosure, a further tightening seal or gasket arrangement, such as deflected gasket lips is arranged so as to seal a space provided between said vacuum insulated glass unit and one of said holding members, and wherein said resilient suspension elements are placed in said sealed space. This may provide a solution where an improved water tightening and/or heat insulation may be provided.

The further tightening seal or gasket arrangement may thus be considered as placed closer to the frame opening than the resilient gasket in respective space.

In one or more aspects of the present disclosure, said resilient gasket or seal member may have a thickness above 4 mm, such as above 5 mm, for example above 6 mm at a temperature difference between the VIG unit glass sheets of substantially 0° C. This thickness may in aspects be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured/defined in a direction perpendicular to the outer major surface of the VIG unit.

In one or more aspects of the present disclosure, said resilient suspension elements may be foam elements, rubber elements, such as substantially solid rubber elements from a rubber material such as natural rubber and/or synthetic rubber, and/or made from a plastic material or silicone.

The suspension elements may e.g. be made from an EDPM (ethylene propylene diene monomer) rubber a silicone material, and/or a foam rubber such as TPE (thermoplastic elastomer), e.g. santoprene.

Generally, the suspension elements may in aspects of the present disclosure have a shore A value between 30 and 95. For example, in one or more embodiments of the present disclosure, the suspension elements may have a shore A value between 30 and 90, such as between 30 and 70 or between 45 and 85.

In one or more aspects of the present disclosure, said compressed suspension elements are configured to restrict the thermal deflection of the vacuum insulated glass unit edges compared to free, un-constricted thermal deflection of the respective edge.

Restricting the VIG unit edge completely from thermal deflection may cause the VIG unit to break and the pressure in the evacuated gap to equalize to the ambient pressure. However, by restricting the VIG unit edge deflection to a certain amount compared to free deflection and no deflection, this may provide a solution where the VIG unit may be less likely to break over time due to thermal deflections. The edge deflection may e.g. in aspects be restricted between 20 and 90%, such as between 40-70% compared to free, un-constricted thermal deflection of the respective edge.

The restriction of the thermal bending of the VIG unit edges may in aspects be provided when larger temperature differences occur, such as temperature differences above 30° C., or above 40° C.

In one or more aspects of the present disclosure, the largest total edge deflection in a deflection direction of any of the edges of the vacuum insulated glass unit at a temperature difference ($\Delta T=T1-T2$) between the two glass sheets of 65° C. as compared to the vacuum insulated glass unit at a temperature difference of 0° C. may be at least 2 mm, such as in the range of 2 to 40 mm, such as in the range of 5 to 35, mm, preferably in the range of 8 to 20 mm.

In one or more aspects of the present disclosure, the largest total edge deflection in said deflection direction (D1, D2) of any of the edges (8a-8d) of the vacuum insulated glass unit at a temperature difference ($\Delta T=T1-T2$) between the two glass sheets (2a, 2b) of 40° C. as compared to the vacuum insulated glass unit at a temperature difference ($\Delta T=T1-T2$) of 0° C. is at least 1 mm, such as in the range of 1 to 25 mm, such as in the range of 3 to 15 mm, preferably in the range of 4 to 12 mm.

In one or more aspects of the present disclosure, the largest total edge deflection of any of the edges of the vacuum insulated glass unit at a temperature difference ($\Delta T=T1-T2$) between the two glass sheets of 65° C. as compared to the vacuum insulated glass unit at a temperature difference ($\Delta T=T1-T2$) of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

In one or more aspects of the present disclosure, the largest total VIG unit deflection of any of the edges of the vacuum insulated glass unit, at a temperature difference ($\Delta T=T1-T2$) between the two glass sheets of 40° C. as compared to the vacuum insulated glass unit at a temperature difference ($\Delta T=T1-T2$) of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned allowed total edge deflection may e.g. help to reduce the risk that the VIG unit is damaged over time after it has been installed in the frame, as the frame allows the edge to deflect, e.g. to describe a deflection curve, and hence this may reduce the stresses in the VIG unit compared to a more rigid fixation of the VIG unit in a frame solution.

By the term "total edge deflection" is herein understood the largest distance in the direction perpendicularly to a frame opening plane between the any two positions of an edge of the vacuum insulated glass unit, which in some embodiments may be the sum of the largest distances of positions of the edge in question from the frame opening plane in each their direction from that plane. The frame opening plane is provided/defined by the frame between at least two elongated (such as parallel) frame profiles, and extend in the longitudinal direction of these profiles. The largest total edge deflection of the respective VIG edge may be determined between corners where the VIG edge terminates.

In one or more aspects of the present disclosure, all four edges of said vacuum insulated glass unit are allowed to thermally deflect in a deflection direction perpendicular to the frame opening plane due to a temperature difference ($\Delta T=T1-T2$) between the two glass sheets.

This may e.g. help to further reduce stress conditions in the VIG unit.

In one or more aspects of the present disclosure, said holding members are elongated profile members extending along the vacuum insulated glass unit's edge, such as at least 40%, e.g. at least 60%, such as at least 80%, for example at least 95% of the length (EL) of the respective edge (8a-8d)

This may e.g. help to provide a solution that may be advantageous from manufacturing perspectives and/or to provide a frame having a good structural integrity.

In one or more aspects of the present disclosure, the magnitude of said thermal deflection is configured to vary along one or more of the vacuum insulated glass unit edges between the corners where the respective edge terminates due to said temperature difference ($\Delta T=T1-T2$) between the two glass sheets, thereby describing an edge deflection curve (DC), and wherein said edge deflection curve is configured to be described between said holding members and configured to cause a varying compression of said suspension elements along the respective edge.

This may e.g. help to provide a space saving and yet simple way of allowing edge deflections. It may also or alternatively help to provide a good control of the edge deflection.

In one or more aspects of the present disclosure, said vacuum insulated glass (VIG) unit frame assembly is a building aperture cover such as a door or a window, such as a roof window In In aspects of the present disclosure, the VIG unit frame assembly may be a window or door sash.

VIG units may generally provide good heat insulation and/or other advantages in building aperture covers when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope such scenarios in roof window solutions.

Windows and doors arranged inn outer walls of a building and arranged to cover a building aperture in that outer building wall to allow sunlight to enter a room in the building from the exterior of the building are increasingly exposed to varying temperature differences between the VIG unit glass sheet over the lifetime of the VIG unit frame assembly. Also the climatic condition varies largely dependent on the geographical location where the window or door is installed and/or may vary dependent on the type of window or door. The present disclosure may provide a solution that may be advantageous and suitable for such windows or doors comprising a VIG unit. It may though also be suitable to use in refrigerators, cooler covers or doors, or as or in oven doors.

In one or more aspects of the present disclosure, said suspension elements may be arranged so as to allow a shift in the direction of the thermal deflection of the corners and/or centre parts of the edges of the vacuum insulated glass unit in response to a change in the temperature difference between the two glass sheets of the vacuum insulated glass unit.

It is here understood that said change in the temperature difference $\Delta T = T1 - T2$ between the two glass sheets of the vacuum insulated glass unit provides a switch between which of the glass sheets that is the hotter glass sheet and the colder glass sheet respectively.

This may e.g. help to provide a more cost efficient solution may be obtained and/or a solution where the VIG unit frame assembly can be used in a larger range of climatic conditions and/or applications.

In aspects of the present disclosure, the length ratio between shorter opposing edges and longer opposing edges of the VIG unit may be in the range of 0.3 to 0.9, preferably in the range of 0.35 to 0.85.

In one or more aspects of the present disclosure, a minimum distance may be provided between an outer major surface of the vacuum insulated glass unit and walls of the frame. This minimum distance may be at least 4 mm such at least 5 mm, for example at least 6 mm at a temperature difference $\Delta T$ between the two glass sheets of the vacuum insulated glass unit of substantially 0° C. This may e.g. provide more space and/or deflection freedom in order to allow the VIG unit to thermally deflect relative to the frame. The minimum distance may provide a space in which a fixation system and/or a resilient tightening gasket is placed.

The present disclosure moreover, in a second aspect, relates to a retrofitting system for retrofitting a vacuum insulated glass unit to a frame originally designed for insulated glass panes, for example gas insulated glass panes, such as windows, of greater thickness than the thickness of the vacuum insulated glass unit, wherein said retro-fitting frame system at least comprises:

- a vacuum insulated glass unit comprising at least two glass sheets separated by a gap between said glass sheets, wherein a plurality of support structures are distributed in said gap and wherein said gap is sealed, and
- a plurality of elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame,
- one or more resilient suspension elements configured to be compressed between a holding member and an outwardly facing surface of the vacuum insulted glass unit, and one or more further resilient suspension elements configured to be compressed between a second holding member and an opposite outwardly facing surface of the vacuum insulted glass unit,
- wherein said resilient suspension elements are configured to provide a holding force towards said opposite outwardly facing surfaces of the vacuum insulated glass unit so as to suspend the vacuum insulated glass unit between said first and second holding members, and
- wherein said resilient suspension elements are configured to be further compressed or expand in response to a thermal deflection of the VIG unit due to a temperature difference between the two glass sheets of the vacuum insulated glass unit. This may e.g. provide one or more effects or advantages as e.g. described above.

In one or more aspects of the second aspect, said retrofitting system comprises elongated frame profiles to be attached to said frame originally designed for gas insulated glass panes,

- wherein said elongated frame profile comprises walls forming a U-shape providing a recess for receiving the edge of the vacuum insulated glass unit,
- wherein said resilient suspension elements are configured to be placed in a space between the walls of the elongated frame profile and the outwardly facing surface of the Vacuum insulated glass unit.

In one or more aspects of the second aspect, said elongated frame profiles and said suspension elements are pre-mounted at said vacuum insulated glass unit.

This may e.g. help to assure a faster installation and/or reduce the risk of installation errors.

In one or more aspects of the second aspect, said retrofitting frame system is configured so as to provide a vacuum insulated glass unit frame assembly according to any of claims 1-25 after it has been installed in said a frame originally designed for insulated glass panes of greater thickness than the VIG unit.

The present disclosure further, in a third aspect, relates to a method of retrofitting a vacuum insulated glass unit to a frame originally designed for insulated glass panes such as windows of greater thickness than the vacuum insulated glass unit (1), wherein said method comprises the steps of:

- providing a retrofitting system according to any of the second aspect or aspects thereof,
- arranging the vacuum insulated glass unit in said frame so that the vacuum insulated glass unit is suspended between the suspension elements of the retro fitting system, and hence fixed to the frame originally designed for insulated glass panes such as windows of greater thickness than the vacuum insulated glass unit of the retrofitting system, providing the elongated tightening seals/gasket arrangements of the retro fitting system so that they are arranged to follow a deflection of the vacuum insulated glass unit when it thermally deflect, thereby providing a water tightening and/or air tightening of a space provided between one or more frame profiles members and an outer surface of the vacuum insulated glass unit.

The present disclosure additionally, in a fourth aspect, relates to a vacuum insulated glass unit comprising a linear edge with an edge seal, wherein the vacuum insulated glass unit is structurally affixed to a frame by means of resilient suspension elements which are arranged or distributed along edges of the vacuum insulated glass unit, wherein the resilient suspension elements are pre-compressed between opposite, outwardly facing surfaces of the vacuum insulated glazing and a part of the frame, and wherein the vacuum insulated glass unit is configured to cause a varying compression of said pre-compressed suspension elements due to a difference in the magnitude of a thermal deflection along the vacuum insulated glass unit's edges.

In aspects of said above mentioned fourth aspect, said vacuum insulated glass unit may be provided by a vacuum insulated glass unit frame assembly according to any of claims 1-25, and/or is obtained by means of a retro fitting system and/or a method of retrofitting according to any of claims 26-30.

The present disclosure additionally relates to use of a retro fitting system, such as a retro fitting system according to any of claims 26-29 for providing a vacuum insulated glass (VIG) unit frame assembly according to any of claims 1-25 and/or for providing a vacuum insulated glass unit according to any of claims 31-32.

FIGURES

Aspects of the present disclosure will be described in the following with reference to the figures in which:

FIG. 1: Illustrates a VIG unit frame assembly according to embodiments of the present disclosure, FIG. 2: illustrates schematically a VIG unit 1 to be arranged in a frame according to embodiments of the present disclosure, FIGS. 3-4: Illustrates a thermally deflecting VIG unit according to embodiments of the present disclosure, FIG. 5: Illustrates a thermally deflecting VIG unit subjected to varying temperature difference according to embodiments of the present disclosure, FIG. 6: illustrates a holding part of an elongated frame profile arrangement according to embodiments of the present disclosure FIG. 7: illustrates schematically a VIG unit suspended between resilient, compressed suspension elements according to embodiments of the present disclosure, FIGS. 8-9: illustrates schematically further embodiments of a VIG unit frame assembly, according to embodiments of the present disclosure, FIG. 10: illustrates a thermally deflecting VIG unit in a frame, according to embodiments of the present disclosure, FIGS. 11-12: illustrates fixation gasket assemblies providing suspension elements according to embodiments of the present disclosure, FIGS. 13-14: illustrates discretely arranged suspension elements, according to embodiments of the present disclosure, FIGS. 15*a*-15*b*: illustrates connections by means of adhesive layers according to embodiments of the present disclosure, FIGS. 16-17: illustrates a VIG unit frame assembly comprising an elongated base member and an elongated glazing member according to embodiments of the present disclosure, FIGS. 18-18*a*: illustrates retro-fitting solutions according to embodiments of the present disclosure, FIGS. 19-21: illustrates embodiments of the present disclosure where a VIG unit of a VIG unit frame assembly is a laminated VIG unit, FIG. 22: illustrates an embodiment of the present disclosure where compressed suspension elements hold a VIG unit at one glass sheet, according to embodiments of the present disclosure, FIGS. 23-24: illustrates an embodiment of the present disclosure where a VIG unit held by compressed suspension elements and holding members is a hybrid type VIG unit according to embodiments of the present disclosure, FIG. 25: illustrates a visualized computer simulation of a thermal deflection of a VIG unit, and FIGS. 26-27: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a vacuum insulated glass unit frame assembly 10 for use as e.g. a building aperture cover such as a window or a door according to embodiments of the present disclosure. The vacuum insulated glass unit frame assembly 10 comprises a vacuum insulated glass (VIG) unit 1, and a frame 20. The frame 20 comprises elongated frame profile arrangements 20*a*-20*d* which frames the vacuum insulated glass unit 1 in a frame opening 21, defining a frame opening plane.

These elongated frame profile arrangements 20*a*-20*d* comprises substantially parallel top and bottom frame profile arrangements 20*c*, 20*d*, and substantially parallel side profile frame arrangements 20*a*, 20*b*. Two, two, three or all (as illustrated) of said top, bottom and/or side profile frame arrangements 20*a*-20*d* at least partly, such as fully, encloses the VIG edges 8*a*-8*d*. Two or more of said frame profile arrangements 20*a*, 20*b*, 20*c*, 20*d* may comprises one or more holding parts 28 as disclosed in more details below.

Gasket arrangements 50*a*, 50*b* may be arranged to seal a space between the frame profile arrangements 20*a*-20*d* and the VIG unit 1 in one or more embodiments of the present disclosure, as e.g. described in more details later on.

As can be seen, the frame 20 may be attached to a fixed frame arrangement 30, such as in case the frame 20 is configured to be opened and closed while hanging from a hinge system (not illustrated) connecting the frame 20 and the fixed frame arrangement 30. In other embodiments, the sash or frame 20 may also be fixed in an un-openable manner to the fixed frame or directly to a building structure.

The frame profile arrangements 20a-20d defines a frame opening 21 plane P2 extending between the frame profile arrangements 20a-20d in the frame opening 21.

Figure 2:
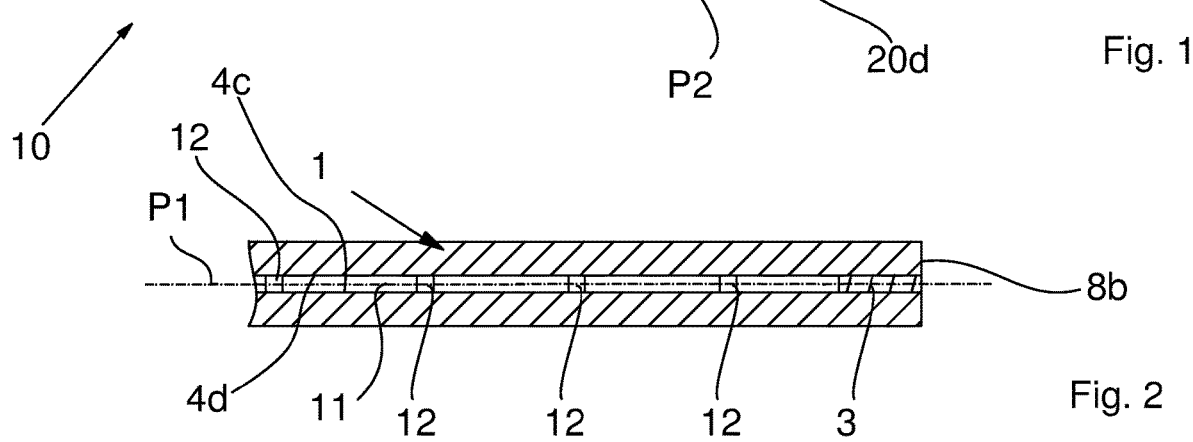

FIG. 2 illustrates schematically a cross sectional view of a rectangular VIG unit 1 to be arranged in the frame 20 according to embodiments of the present disclosure. The VIG unit comprises two glass sheets 2a, 2b such as tempered glass sheets, e.g. thermally tempered glass sheets, but it may also be annealed glass sheets.

The glass sheets 2a, 2b are separated by a gap 11 between the glass sheets 2a, 2b, and a plurality of support structures 12 are distributed in the gap 11. The gap 11 may for example be 0.05-0.5 mm. The gap 11 is sealed by an edge sealing 3, such as a fused edge sealing which may e.g. be made from a solder glass material, e.g. low melting temperature solder glass material, or a metal solder material.

The support structures 12 may be made from metal, glass or polymer and be arranged in a grid or another pattern. 12 maintain the gap 11 between the glass sheets 2a, 2b when the gap is evacuated to a pressure below e.g. $10^{-3}$ bar, such as below $10^{-4}$ bar, e.g. to about or below $10^{-3}$ mbar. The glass sheets 2a, 2b comprises major surfaces 4c, 4d facing the gap, and the support structures support on these surfaces. The glass sheets also comprises outwardly facing major surfaces 4a, 4b facing away from the gap 11.

The VIG unit's thickness, measured between the outwardly facing surfaces of the VIG unit may in embodiments be between 4-15 mm such as between 4-12 mm, e.g. 4-10 mm.

Especially if the VIG unit glass sheets 2a, 2b are tempered glass sheets, the distance between neighbouring/adjacent support structures may be above 3 cm or above 4 cm, such as between 3 cm and 6 cm in the evacuated VIG unit gap 11.

As described in more details later on, the VIG unit may also be a laminated VIG unit and/or a VIG unit of a Hybrid type comprising a further glass sheet providing and a further sealed gap between this glass sheet and the VIG unit that may be filled with a gas.

The VIG unit 1 defines a VIG unit plane P1 that will extend parallel to or coincide with the frame opening 21 plane P2 when the VIG unit is arranged in the frame 20. This plane P1 may e.g. be determined when the VIG unit glass sheets 2a, 2b have the substantially same temperature.

Figure 3:
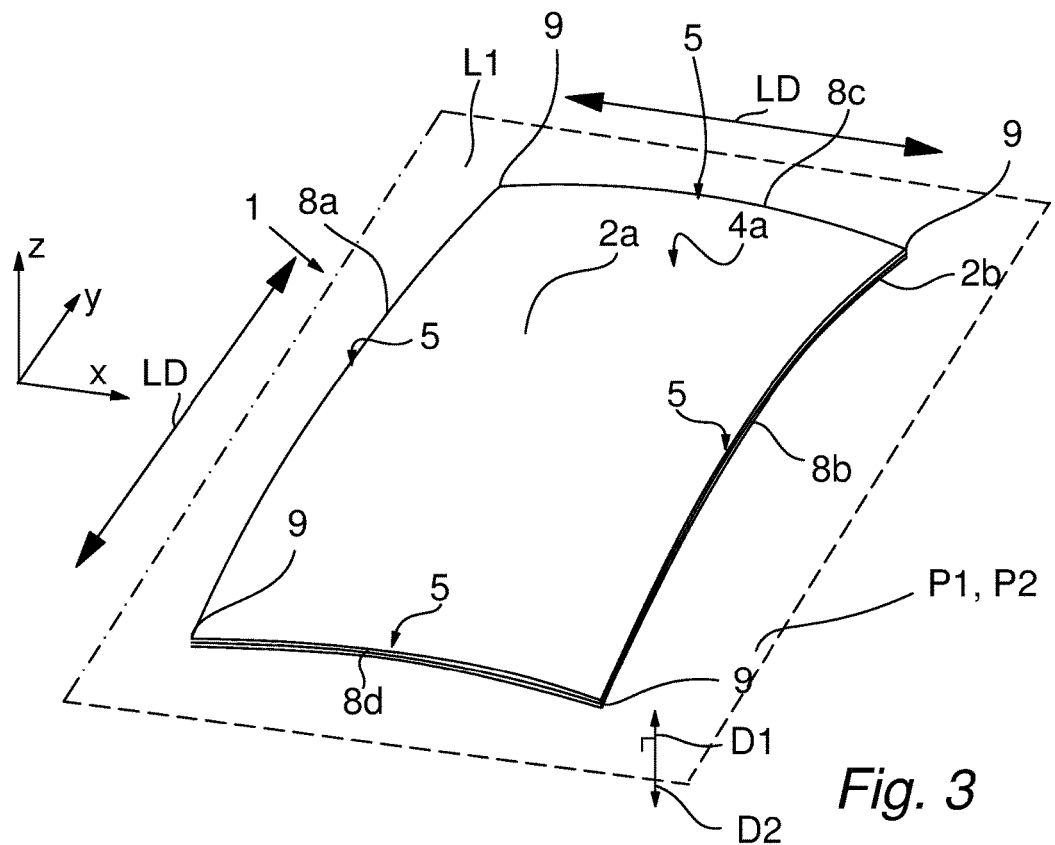
Figure 4:
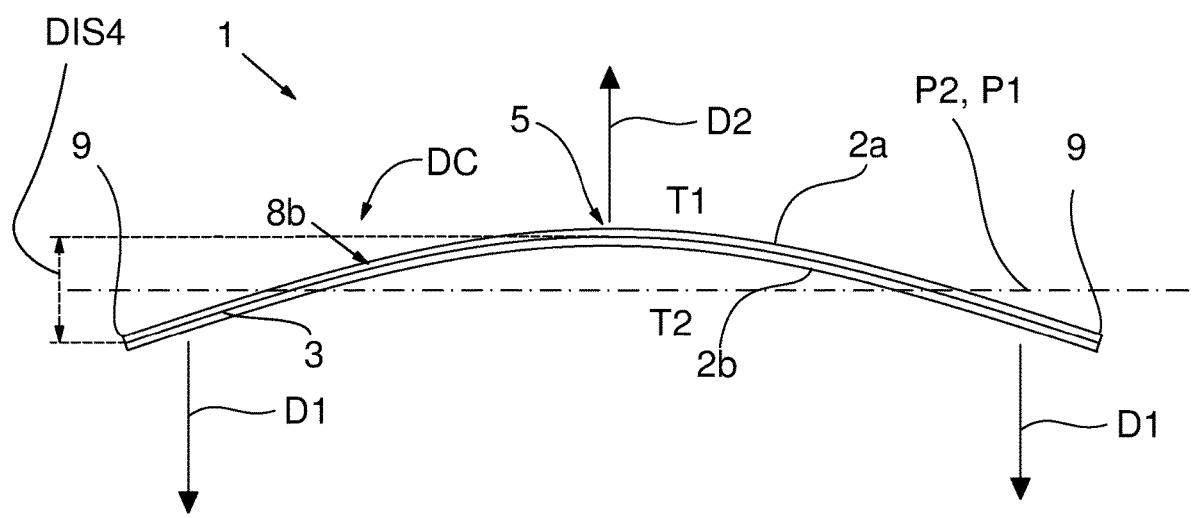

FIGS. 3 and 4 illustrates schematically a VIG unit thermal deflection as a result of a temperature difference ΔT=T1−T2 between the two glass sheets 2a, 2b, according to embodiments of the present disclosure.

In FIG. 3, the VIG unit 1 is shown schematically and in perspective, where it can be seen that the outer major surface 4a of the VIG unit may thus obtain a convex shape when T1 is higher than T2 whereas the outer surface 4b of the other (lower) glass sheet 2b provides a concave shape due to a thermal deflection.

The VIG unit deflects relative to the VIG unit plane P1 (determined where ΔT is substantially zero) and relative to the frame opening plane P2, in the directions D1, D2 which are perpendicular to the planes P1 and/or P2.

The planes P2 and P1 extends in the x-y direction, and the thermal deflection of the VIG unit edges 8a-8d is provided in the z direction relative to the planes P1, P2.

The length of the longer opposing edges 8a, 8b may in embodiments of the present disclosure be in the range of 500 to 3000 millimetres, preferably in the range of 600 to 1300 millimetres.

In embodiments of the present disclosure, the length ratio between the shorter opposing edges 8c, 8d and the longer opposing edges 8a, 8b, may be in the range of 0.3 to 0.9, preferably in the range of 0.35 to 0.85.

In further embodiments, the length ratio between the shorter opposing edges 8c, 8d and the longer opposing edges 8a, 8b may be in the range of 0.3 to 0.7, preferably in the range of 0.35 to 0.6.

FIG. 4 illustrates schematically and seen from the side onto the long edge 8b, the thermal deflection of the edge 8b. As can be seen, the VIG unit edge 8b may tend to describe a deflection curve DC due to thermal deflection of edge 8b, caused by a temperature difference ΔT=T1−T2 between the two glass sheets 2a, 2b. In the present example, the glass sheet 2a is subjected to a higher temperature T1 than the glass sheet 2b subjected to temperature T2. This cause the glass sheet 2a to expand more than glass sheet 2b. As the edge seal 3 may provide a very rigid connection between the glass sheets, this causes the VIG unit to thermally deflect, and this temperature difference may cause the edge 8b to describe a deflection curve that varies relative to the frame opening plane P2 and the VIG unit plane P1.

As can be seen from various figures of the present disclosure, the plane P1 and the frame opening plane P2 may coincide. In other embodiments of the present disclosure however, the plane P1 may be parallel to the frame opening plane P2, but may not coincide with the plane.

The outer, major surface 4a of the VIG unit may thus obtain a convex shape when T1 is higher than T2 whereas the outer surface 4b of the other (lower) glass sheet 2b provides a concave shape.

As can be seen, the corners 9 of the VIG unit where the edge 8b terminates may move in a first direction D1 relative to the plane P1 and/or P2, whereas the centre portion 5 of the edge 8b, is may move in the opposite direction D2 than the first direction D1, relative to the plane P1 and/or P2.

When/if the glass sheet 2b gets hotter than glass sheet 2a, caused by a temperature change of T1 or T2, the corners 9 of the VIG unit moves in the second direction D2 relative to the plane P1 and/or P2, and the centre portion 5 of the edge 8b, move in the first direction D1, relative to the plane P1 and/or P2.

Figure 5:
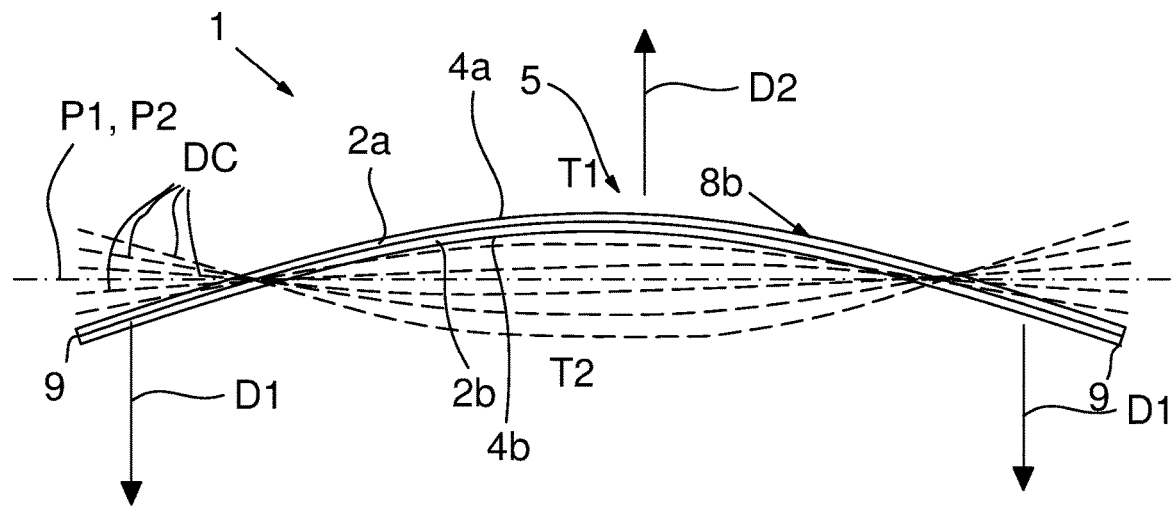

FIG. 5 illustrates an example of a situation where a VIG unit 1 is subjected to a varying temperature difference ΔT=T1−T2 between the glass sheets 2a, 2b over time, according to embodiments of the present disclosure.

For example, it is common for e.g. building aperture covers such as windows or doors arranged in openings of outer walls, roofs or the like of a building, that these are subjected to varying temperature differences over time after they have been installed. Similar temperature differences also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference ΔT may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference ΔT to switch operational sign: The temperature T1 is 20° C. at the inside, and T2 (outside) is 10° C. at 8 PM. Thus, the VIG unit edge 8b corners 9 deflect in a first direction D1 as illustrated in FIG. 3. Then the thermal deflection of the VIG unit edge 8b gradually changes (illustrated by dashed deflection curves DC) as the temperature T2 changes to be 35° C. at 3 AM at surface 4b, and thus 15° C. higher than T1. Thus, the VIG unit thermal deflection changes so that it deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8a-8d near the location where the VIG unit glass sheets are connected to seal the gap by e.g. an edge sealing 3. The stress conditions are complex. Examples of these stresses may be shear stresses at the VIG edge, differential stresses where tensile stress occurs at the deflecting glasses and/or stress concentrations at the corners.

In one or more embodiments of the present disclosure, the largest total deflection DIS4 of any of the edges 8a-8d of the vacuum insulated glass unit 1, at a temperature difference ΔT=T1−T2 between the two glass sheets 2a, 2b of 65° C. (compared to the zero-edge deflection at ΔT=0) may be at least 2 mm, such as in the range of 2 to 40 mm, such as in the range of 5 to 35, mm, preferably in the range of 8 to 20 mm when the VIG unit is arranged in the frame.

In one or more other embodiments of the present disclosure, the largest total deflection of any of the edges 8a-8d of the vacuum insulated glass unit 1, at a temperature difference ΔT=T1−T2 between the two glass sheets 2a, 2b of 40° C. may be configured to be at least 1 mm, such as in the range of 1 to 25 mm, such as in the range of 3 to 15 mm, preferably in the range of 4 to 12 mm when the VIG unit is arranged in the frame.

In one or more other embodiments of the present disclosure, the largest total deflection of any of the edges 8a-8d of the vacuum insulated glass unit 1, at a temperature difference ΔT=T1−T2 between the two glass sheets 2a, 2b of 65° C. may be at least 0.3% of the length of the deflecting edge (8a-8d), such as in the range of 0.3% to 3.5% of the length of the deflecting edge (8a-8d), such as in the range of 0.4% to 2% of the length of the deflecting edge (8a-8d), such as in the range of 0.6% to 1.5% of the length of the deflecting edge (8a-8d).

In one or more other embodiments of the present disclosure, the largest total deflection of any of the edges 8a-8d of the vacuum insulated glass unit 1, at a temperature difference ΔT=T1−T2 between the two glass sheets 2a, 2b of 40° C. may be at least 0.15% of the length of the deflecting edge (8a-8d), such as in the range of 0.15% to 3% of the length of the deflecting edge (8a-8d), such as in the range of 0.25% to 1.8% of the length of the deflecting edge (8a-8d), such as in the range of 0.35% to 1.2% of the length of the deflecting edge (8a-8d).

The above mentioned deflections may in aspects be determined relative to the state of the VIG unit edge position/deflection when the VIG unit glass sheets have an identical/the same temperature such as 20° C. It may e.g. be measured by an optical measuring instrument such as a laser distance measuring instrument/sensor.

If the VIG unit has a shape and/or size where at least some of the edges of the VIG unit may risk thermally deflecting more than the above mentioned deflection(s) (e.g. comprising opposing parallel long edges that are longer than other opposing parallel shorter edges), the frame may in embodiments of the present disclosure comprise or provide a restriction arrangement for restricting the thermal deflection of the edge(s) compared to a unrestricted edge deflection, such as for example the longest edges of the VIG unit or all edges of the VIG unit. This restriction arrangement may comprise a gasket solution, one or more stop parts of the frame preventing an edge deflection above a certain point and/or the like, also, the suspension elements described below may provide such a restriction in embodiments of the present disclosure.

It is generally understood that in embodiments of the invention, all four edges 8a-8d of the vacuum insulated glass unit 1 may be allowed to thermally deflect in a deflection direction D1, D2 perpendicular to the frame opening plane P2 due to a temperature difference ΔT=T1−T2 between the two glass sheets 2a, 2b.

Figure 6:
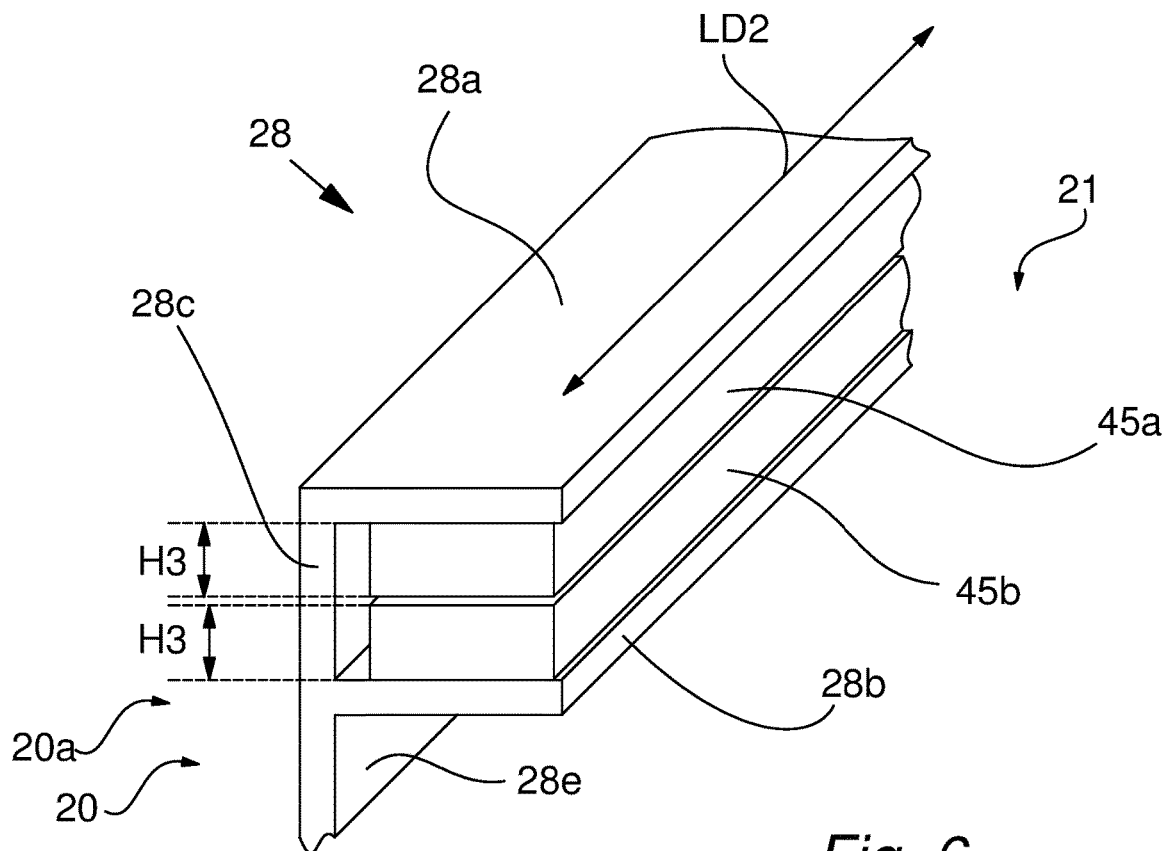

FIG. 6 illustrates schematically and in perspective a holding part of an elongated frame profile arrangement 20a according to embodiments of the present disclosure.

The holding part 28 comprises two elongated holding members 28a, 28b in the form of walls spaced from each other and extending parallel to each other in the longitudinal direction LD2 of the holding part 28.

The walls/legs 28a, 28b are integrated in and part of the holding member 28, and are connected by means of a connection wall 28c extending between the elongated walls 28a, 28b to provide a U-shaped recess 29 configured to receive an edge 8a-8d of the vacuum insulated glass unit 1. The holding member 28 is thus an elongated frame profile 28.

The holding member is configured to hold the VIG unit edge areas in the frame profile member and thus in the frame between the two holding members 28a, 28b, and these holding members are configured to be arranged at opposite outwardly facing surfaces of the vacuum insulated glass unit.

A first 45a, and a second 45b compressible, resilient suspension element are placed in the recess 29 between the holding members 28a, 28b. In fig. When the VIG unit 1 edge is placed in the recess 29, the VIG unit thickness will be larger than the space (if any) between the suspension elements 45a, 45b in an uncompressed state. This will cause the suspension elements to be compressed by the VIG unit surfaces (see FIG. 7), between the holding members 28a, 28b and the opposite outwardly facing surfaces 4a, 4b of the vacuum insulated glass unit 1.

Accordingly, the suspension elements are pre-compressed between the holding members 28a, 28b and the opposite outwardly facing surfaces 4a, 4b of the vacuum insulated glass unit 1. Hence, each of the first and second resilient suspension elements 45a, 45b will due to this pre-compression provide a holding force towards the opposite outwardly facing surfaces of the vacuum insulated glass unit 1, hence fixating the VIG unit in the frame 20.

The resilient suspension elements (45a, 45b) may be foam gaskets, rubber gaskets made from a rubber material such as natural rubber and/or synthetic rubber, and/or or a plastic material. The suspension elements may e.g. be made from an EDPM (ethylene propylene diene monomer) rubber a silicone material, and/or a foam rubber such as TPE (thermoplastic elastomer), e.g. santoprene.

The resilient gaskets 45a, 45b may as illustrated be elongated gasket strips configured to extend in the longitudinal direction of the edge 8a-8d of the vacuum insulated glass unit extending into the recess 29, and the gaskets 45a, 45b extend in the longitudinal direction LD2 of the holding part 28. These may in embodiments of the present disclosure extend continuously in substantially the entire length EL of the VIG unit edge.

The holding member 28 may in embodiments of the present disclosure be manufactured by means of a moulding process, an extrusion process or a pultrusion process, such as co-manufacturing such as co-extrusion or co-pultrusion.

The holding member 28 may in embodiments of the present disclosure be made from a plastic material such as a PVC material, it may be composite material such as a glass or carbon fibre material, the holding member 28 may be made from a plastic material with fibres embedded to obtain a more strong/rigid profile and/or the like. Also, in one or more embodiments, the holding member may be made from a metal such as aluminium.

The suspension elements 45a, 45b allows the centre portion 5 and the corners 9 to provide the above mentioned thermal deflection, but at the same time provides a fixation of the VIG unit in the respective frame profile 20a-20d, irrespectively of if the temperature difference varies.

Figure 7:
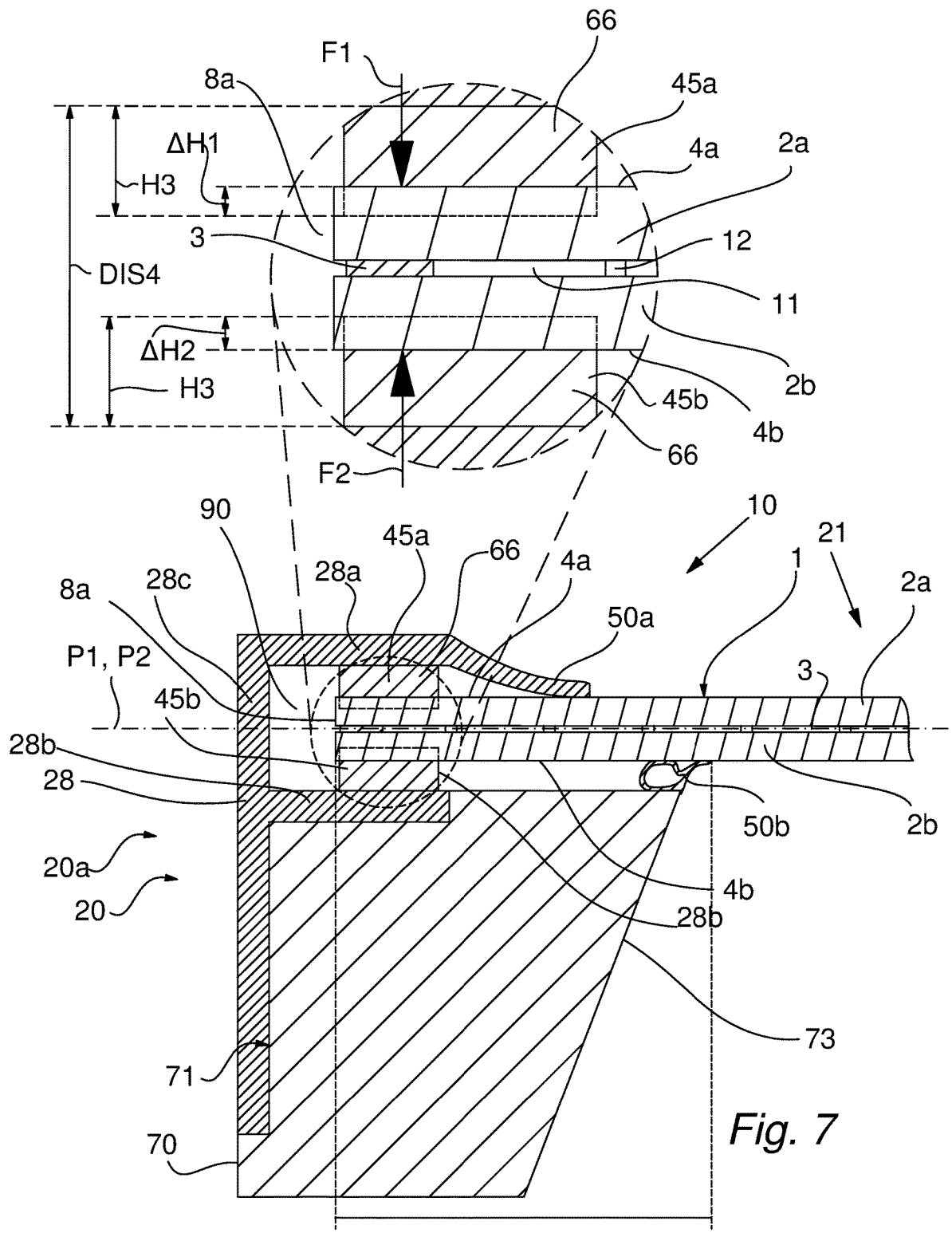

As can be seen, the holding member 28 may also in embodiments of the present disclosure comprise a sash connection part 28e for connecting the member 28 to a sash member, see FIG. 7. The sash connection part 28e, the wall part 28c and the holding members 28a, 28b may together may in embodiments of the present disclosure form a F-shaped profile as illustrated. It may also form an E-shape (not illustrated) if the sash connection part comprises a part extending into a recess in the sash.

The distance/width W2 between the surfaces 6a, 6b of the holding members 28a, 28b facing the recess 29 may on embodiments of the present disclosure be configured to vary less than 8%, such as less than 5%, such as less than 1% when the resilient suspension elements 45a, 45b expands or are further compressed by the vacuum insulated glass unit 2 when said temperature difference ($\Delta T=T1-T2$) between the two glass sheets 2a, 2b changes, compared to the distance W2 at a $\Delta T$ of 0° C. This may in further embodiments of the present disclosure at least apply for a temperature difference $\Delta T$ that is less than 80° C., such as less than 70° C., e.g. less than 65° C. For example it may apply at least when the temperature difference varies in the range of 5° C. to 65° C., such as from −15° C. to +45° C.

However, in further embodiments, larger magnitudes of thermal deflections of the VIG unit within the above mentioned temperature span may cause a small deflection of the holding members 28a, 28b, away from each other, at least at some locations such as e.g. at the centre area Sand/or the corner areas of the VIG unit.

In embodiments of the present disclosure, the distance/width W2 between the holding members 28a, 28b may, at least at some areas of the holding members 28a, 28b be configured to be allowed to vary due to the thermal deflection, such as between 0.1% and 10%, e.g. between 0.5% and 8%, such as between 0.1% and 4%, for example between 0.5% and 3% of the width W2 (determined at $\Delta T=0°$ C.) in the above mentioned temperature range, but the distance/width W2 may also in further embodiments of the present disclosure be substantially constant, and thus substantially no variation in the distance/width W2 may occur during the thermal deflection.

FIG. 7 illustrates schematically a cross sectional view embodiments of the present disclosure where an edge 8a of the VIG unit 1 extend into the recess/space 29 provided between the support members such as legs or walls 28a, 28b, of the holding member 28 of the frame profile 20a.

The presence of the VIG unit in the recess 29 causes, due to the thickness of the VIG unit 1 measured between the outer major surfaces 4a, 4b, each of the suspension elements 28a, 28b to be compressed a certain distance $\Delta H1$, $\Delta H2$.

As can be seen, the resilient gaskets may in embodiments of the present disclosure be configured to provide a fixation of the vacuum insulated glass unit 1 at opposite, outer surfaces 4a, 4b, of the vacuum insulated glass unit 1 unit along and opposite to an edge seal 3 of said vacuum insulated glass unit 1 which seals the gap 11 between the VIG unit glass sheets 2a, 2b. The edge seal 3 may thus be placed between the suspension elements 45a, 45b. In further embodiments (not illustrated), the evacuated gap may be placed between the suspension elements 45a, 45b, and these elements 45a, 45b may thus not be arranged opposite to the edge seal 3.

The resilient suspension elements 45a, 45b are configured to be compressed or expand in response to a change in the thermal deflection of the VIG unit 1 due to a change in temperature difference ($\Delta T=T1-T2$) between the two glass sheets.

The sum $\Sigma\Delta H$ of the compression $\Delta H1$, $\Delta H2$ of the first and second resilient suspension elements 45a, 45b measured perpendicularly to the outwardly facing surfaces (4a, 4b) of the vacuum insulated glass unit may in embodiments of the present disclosure be at least 3 mm or 4 mm, such as at least 5 mm, such as at least 7 mm, such as at least 8 mm at least at one position along an outer circumference of the vacuum insulated glass unit 1.

This sum $\Sigma\Delta H$ of the compression may remain substantially constant at a given location of the edge 8a as the thermal deflection of the VIG unit in one direction may cause an increased compression of one of the resilient gaskets 45a, 45b, but will also cause a corresponding expansion of the other suspension element 45a, 45b at the same edge location.

One or both of the resilient gaskets 45a, 45b, may in embodiments of the present disclosure be subjected to a compression $\Delta H1$, $\Delta H2$ of at least 2 mm, such as at least 3 mm e.g. at least 4 mm between the VIG unit 1 surfaces 4a, 4b and the respective holding member 28a, 28b, measured e.g. perpendicularly to the outwardly facing surfaces 4a, 4b of the vacuum insulated glass unit, at a temperature difference ($\Delta T=T1-T2$) between the two glass sheets 2a, 2b of substantially 0° C. This may also apply at least at one position along an outer circumference of the vacuum insulated glass unit 1, it may apply at a plurality of positions, such as ten or twenty positions, or at any position around the VIG unit.

The difference in the compression ΔH1, ΔH2 of the resilient suspension elements 45a, 45b at substantially any position along the VIG unit edge 8a-8d, may be configured to be less than 20%, such as less than 10%, such as no more than 5%, at a temperature difference (ΔT=T1−T2) between the two glass sheets 2a, 2b of substantially 0° C.

The suspension elements 45a, 45b may be substantially similar; they may in an uncompressed state have a substantially similar uncompressed height H3, width and/or cross sectional shape, may be made from the same material, and/or may have substantially the same density and/or elastic modulus/modulus of elasticity properties.

One or both of the resilient suspension elements 45a, 45b may in embodiments of the present disclosure have a height H3 of at least 7 mm such as at least 10 mm, for example at least 12 mm in an uncompressed state.

In one or more embodiments, the resilient suspension elements 45a, 45b may have a height H3 of between 7 mm and 30 mm, such as between 7 mm and 20 mm, e.g. between 10 mm and 16 mm in an uncompressed state.

The suspension elements 45a, 45b may in embodiments of the present disclosure have a shore A value between 30 and 95. For example, in one or more embodiments of the present disclosure, the suspension elements may have a shore A value between 30 and 90, such as between 30 and 70 or between 45 and 85.

In one or more embodiments, the suspension elements 45a, 45b may at least at some areas have a shore A value above the shore A value of one or both further gasket(s) 50a, 50b (if present).

The suspension elements 45a, 45b are configured to transfer sudden outer forces such as wind gusts or foreign objects striking the VIG unit to the holding member 28, which transfer the force to the sash, and the sash may thus, transfer the force to the building construction or frame to which the VIG unit frame assembly 10 is connected.

FIG. 7 moreover illustrates an embodiment of the present disclosure, wherein the holding member 28 is attached to a sash profile 70 at a connection area 71 of a sash profile 70. The sash profile 70 may be a wood material profile, or alternatively be a plastic profile such as a PVC profile, a composite profile such as a fibre reinforced profile, it may be a metal profile and/or the like. One or more surfaces of the inner sash profile 70, such as the surface 73 facing in an opposite direction than the surface providing the connection area 71, may in embodiments of the present disclosure be designed and arranged to be visible to the end user.

FIG. 7 additionally illustrates an embodiment of the present disclosure wherein a further tightening seal or gasket arrangement 50a, 50b is/are arranged so as to seal a space 66 provided between the vacuum insulated glass unit's outer surface 4a, 4b and one of said holding members 28a, 28b. The resilient suspension elements 45a, 45b are placed in this space 66.

The further tightening seal 50a is arranged to seal the space 66 from e.g. rain water, condensation or the like, and may comprise e.g. a deflected or compressed rubber gasket, plastic member a butyl or silicon seal material, a foam and/or the like. In the present example, the gasket or seal 50a comprises an elongated lip deflected by the VIG unit surface 4a, and when the VIG unit's thermal deflection varies at the edge 8a, this causes the elongated lip to either be further deflected by the VIG unit or be less deflected dependent on the direction of the change of the thermal deflection of the VIG unit 1. The further tightening seal 50a may either be co-extruded or co-pultruded with the profile 28, or be provided afterwards.

The further tightening seal 50b is arranged to provide a condensation tightening and/or an air tightening, and may be configured to be arranged at the VIG unit surface 4b to face the interior of the building.

This tightening seal 50b is configured to seal the space 66 between the VIG unit surface 4b and the member 28b. It is in the present example arranged between the sash profile 70 and the VIG unit, near or substantially flush to where the surface 73 terminates. The gasket or seal may comprise e.g. a deflected or compressed rubber gasket, plastic member a butyl or silicon seal material, a foam and/or the like. In the present example, the gasket or seal 50b comprises an elongated, compressed rubber gasket with an enclosed space enclosed by the seal 50b wall. The gasket 50b is deflected by the VIG unit surface 4a, and when the VIG unit's 1 thermal deflection varies at the edge 8a, this causes the elongated gasket 50b to either be further compressed by the VIG unit or be less compressed dependent on the direction of the change of the thermal deflection of the VIG unit 1.

Figure 8:
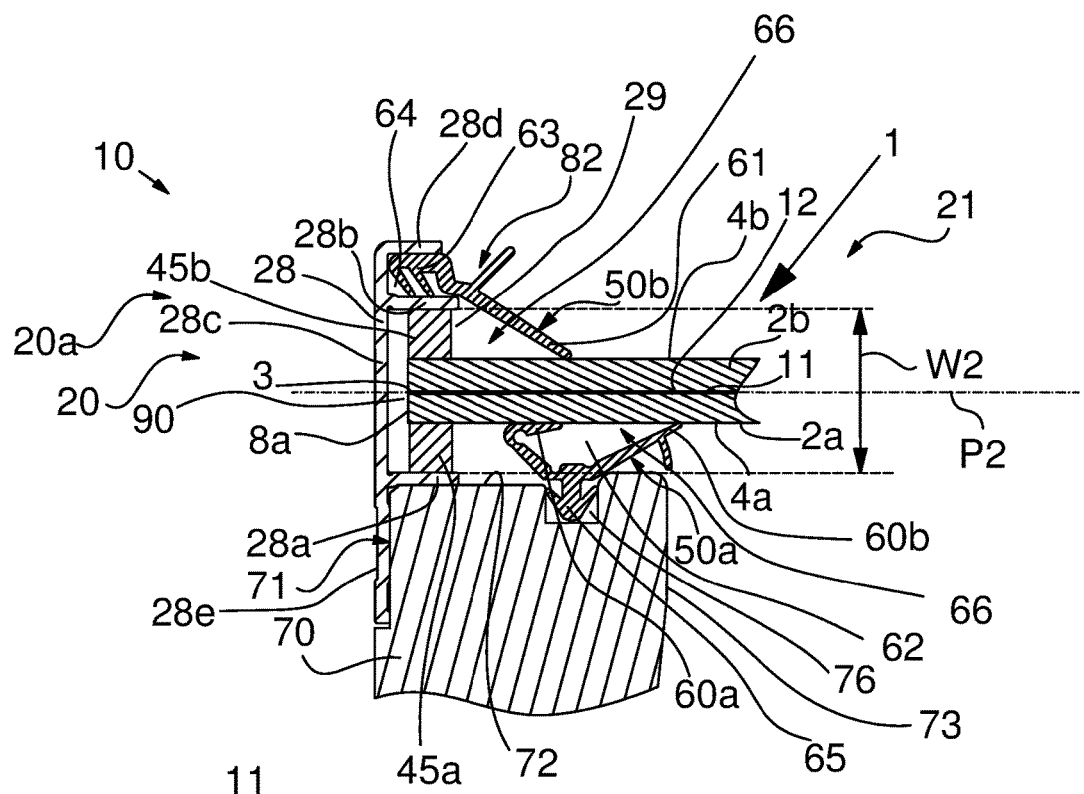

FIG. 8 illustrates schematically a cross sectional view of several embodiments of the present disclosure where the VIG unit frame assembly 10 is a window.

The holding member 28 of the frame 20 of the VIG unit frame assembly 10 is substantially like the embodiment of FIG. 7.

Further gaskets arrangements 50a, 50b beyond the suspension elements 45a, 45b are placed to provide a water tightening and an air tightening respectively.

The gasket arrangement 50a is arranged to provide an air tightening at the surface 4a of the VIG unit 1 for facing the interior of the building, and comprises two elongated flaps/lips 60a, 60b each deflected (and not as such compressed) by the VIG unit surface 4a compared to a free state, and in contact with/abutting the VIG unit surface 4a. These tightening flaps/lips 60a, 60b help to protect against condensation at the VIG unit edge 8a area due to a cold bridge provided between VIG unit glass sheets by the edge sealing 3.

A space 62 defined between the flaps/lips 60a, 60b and enclosed by the VIG unit surface 4a helps to provide an air and/or heat insulation.

The gasket arrangement 50a thus follow the VIG unit edge 8a movement when the VIG unit's thermal deflection changes due to a temperature difference variation, due to the resilient properties of the gasket arrangement 50a, so as to provide an air tightening functionality.

The gasket arrangement 50b is arranged to provide a water tightening at the outer surface 4b of the VIG unit 1 to face away from the interior of the building.

This gasket arrangement 50b also comprises an elongated flap/lip 61 deflected by the outer surface 4b of the VIG unit 1. This flap/lip 61 follow the VIG unit edge 8a movement when the VIG unit's thermal deflection changes due to a temperature difference variation, due to the resilient properties of the gasket arrangement 50b, so as to provide a water tightening functionality, e.g. to protect the interior of the frame such as the space 66 and recess 29 from moist, dew, rain water and/or the like. The gasket arrangement 50b thus follows the difference in the edge deflection curve caused by thermal deflection.

Figure 10:
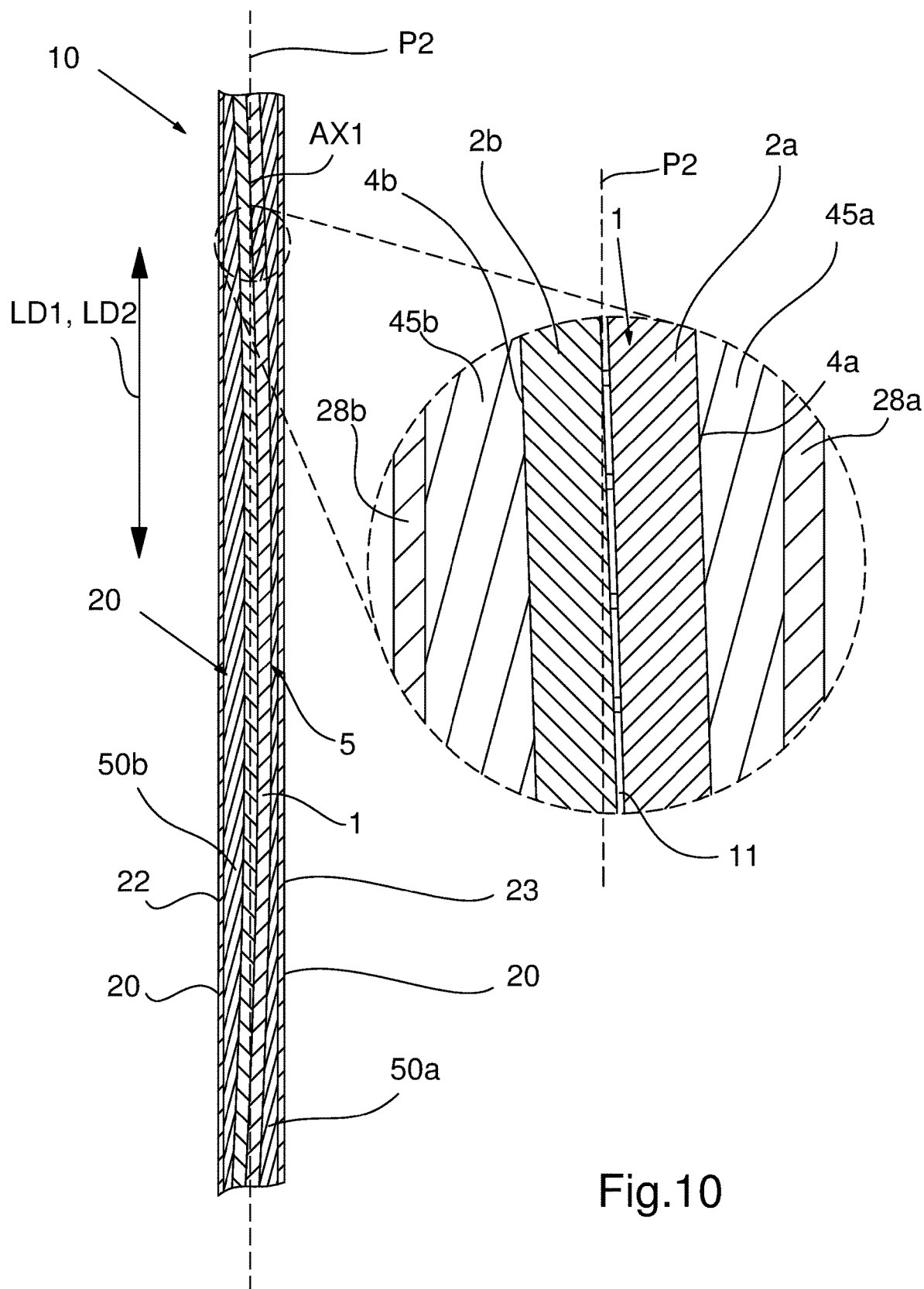

Generally, as one of the gasket arrangements 50a, 50b hence become less deflected by the VIG unit as the thermal deflection of the VIG unit changes, the lips/flaps of the other gasket will at the same location of the VIG edge 8a simultaneously become more deflected as e.g. also illustrated in FIG. 10.

As can be seen, the outer gasket 50b may in embodiments of the present disclosure be connected to the frame by being inserted in a gasket recess 64 of the holding member profile 28 dedicated to this. The recess 76 receives a connection part 63 of the elongated gasket arrangement 61. This gasket recess or groove 64 is defined between the holding member 28b, and a further gasket support member/wall 28d.

The recesses 29 and 64 extends parallel in the longitudinal direction of the frame profile arrangement 20a, along the longitudinal direction of the edge 8a of the VIG unit.

As also can be seen in FIG. 8, the frame profile member 28 may be attached to a sash profile 70. The inner sash profile 70 may in one or more embodiments of the present disclosure be hollow (not illustrated in FIG. 14) to e.g. comprise one or more compartments for heat insulation. One or more these compartments may be filled with an insulating arrangement such as an insulating foam, a polystyrene material, a glass fibre insulation such as glass wool or mineral wool, it may comprise an aerogel insulating material and/or the like.

The profile member's 28 sash connection part 28e extend from the part of the profile 28 comprising/shaping the recess 29 for receiving the VIG unit edge.

The sash connection part 28e may be an elongated part such as a plate profile extending in the longitudinal direction of the VIG unit edge 8a or a plurality of elements projecting from the part of the profile member 28e comprising the recess 29 for receiving the VIG unit edge 8a and distributed in the longitudinal direction of the VIG unit edge 8a. The sash connection part 28e may be connected (at connection area 71) to the inner sash profile 70 by means of mechanical fasteners (not illustrated) such as screws or nails, one or more snap connections, one or more tongue and groove connections and/or the like. The sash connection part 28e may also or alternatively be connected to the inner sash profile 70 by means of an adhesive.

The inner sash profile 70 is configured to face the interior of the building. The inner sash profile 70 comprises a groove 71 in a surface 72 of the sash profile 70 facing the VIG unit surface 4a. This groove 71 receives a connection part 65 of the gasket arrangement 50a, so that the gasket arrangement 50a extend between the sash profile surface 72 and the VIG surface 4a. Also or alternatively, the groove may be arranged in a surface 73.

Figure 14:
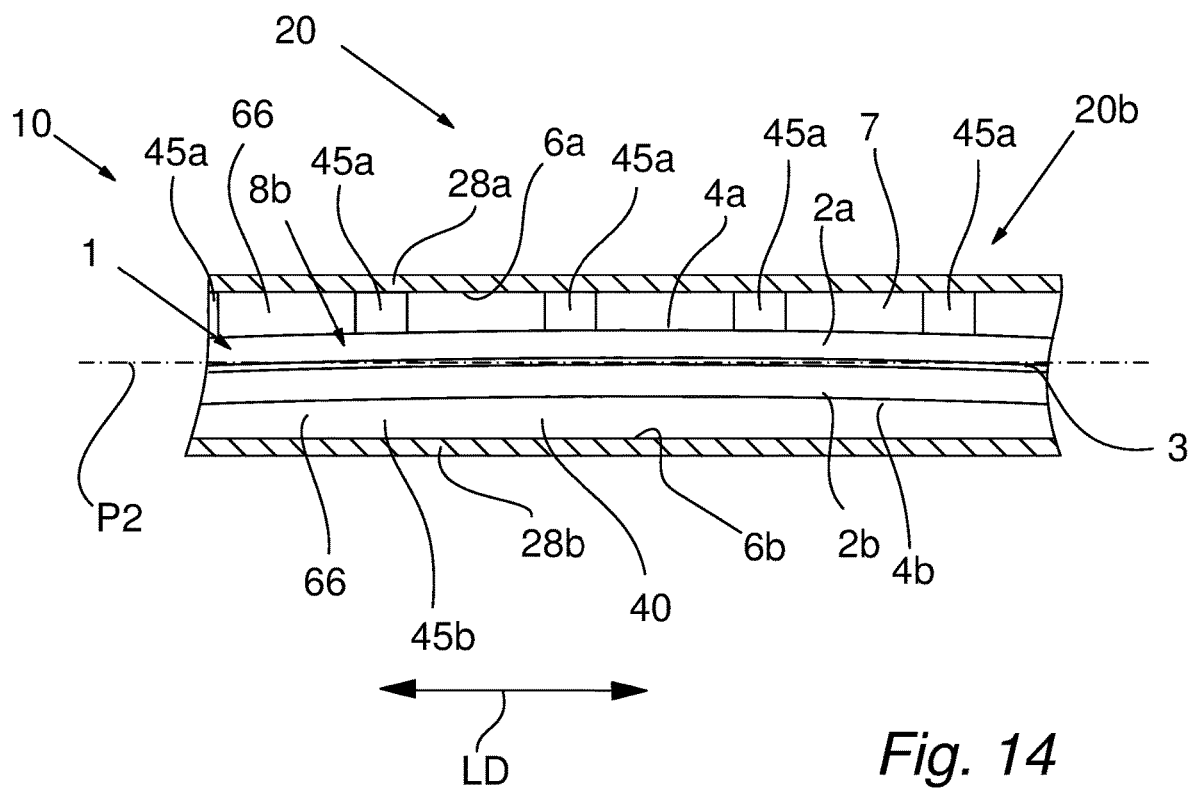

It is naturally to be understood that in other embodiments of the present disclosure, the gasket arrangements 50a, 50b may be attached/connected to the frame by any other suitable means such as by means of glue, nails, screws or the like and/or be attached/connected to the frame at other location than the ones illustrated and described in relation to FIG. 14.

The sash profile 70 may in embodiments of the present disclosure be connected to one or more hinge connections so as to allow the sash profile 70 and thus the remaining part of the frame 20 and the VIG unit 1 to be moved and opened and closed relative to a fixed frame arrangement (not illustrated in FIG. 8).

As illustrated in FIG. 8, the width W2 of the recess 29 between holding members 28a, 28b is larger than the thickness of the part of the VIG unit edge 8a extending into the recess 29, and hence, a predefined space 66 is provided between the outer surface 4a, 4b of the glass sheets 2a, 2b of the VIG unit 1, and frame holding members 28a, 28b, and the surface 72 of the member 70 facing the VIG unit.

The VIG unit 1 can thermally deflect in this space 66 between the walls 28a, 28b so as to describe the previously described "deflection curve" of the edge 8a in the recess. This causes the previously described deflection of the suspension elements 45a, 45b.

In embodiments of the present disclosure, the spaces 66 may be configured to be larger than 4 mm, such as larger than 6 mm, e.g. larger than 8 mm when the VIG unit is kept at a constant temperature such as 20° so that the glass sheets of the VIG unit are at the same temperature. In embodiments, the spaces 66 may be configured to be between 4 mm and 12 mm, such as between 4 mm and 10 mm, e.g. between 5 mm and 8 m when the VIG unit is kept at a constant temperature such as 20° so that the glass sheets of the VIG unit are at the same temperature.

The space 66 may in embodiments of the present disclosure provide that a minimum distance between one or both outer major surfaces 4a, 4b of the vacuum insulated glass unit and walls 28a, 28b, 72 of the frame is at least 4 mm such at least 5 mm, for example at least 6 mm at a temperature difference between the two glass sheets 2a, 2b of the vacuum insulated glass unit of substantially 0° C. This distance may in further embodiments correspond to the height of the suspension element(s) when these are in a compressed condition (see FIG. 7).

The gasket flap/lips 60a, 60b, 61 seals this space 66, and may thus comprise a surface facing the exterior of the frame arrangement 20.

Figure 9:
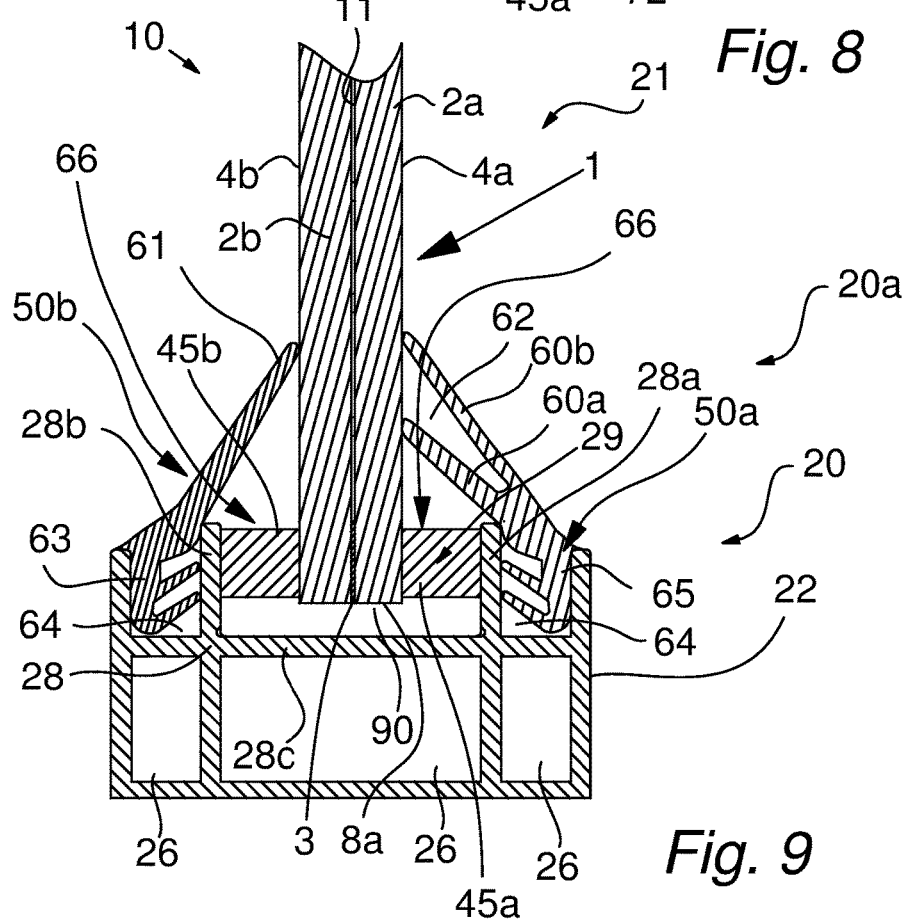

FIG. 9 illustrates schematically a cross sectional view of a VIG unit frame assembly 10, according to embodiments of the present disclosure. The VIG unit frame assembly may be used in a window or a door such as a vertical window or a door, or a roof window. Some of the same design concepts as illustrated in FIGS. 6, 7 and/or 8 and described in relation to these figures are used in the embodiment of FIG. 9.

The suspension elements 45a, 45b are compressed between the two holding members 28a, 28b, e.g. legs or walls, of the holding part 28 of the frame assembly 20, and the VIG unit 1 extending in between these suspension elements.

In the present embodiment, the frame profile member 28 is a base member 22 that may have been extruded, pultruded or moulded, and the base member may either be configured/intended to be fixed to a building structure of a fixed frame arrangement 30 (not illustrated in this figure), or be attached directly to a building structure. The holding members 28a, 28b are connected by a wall part 28c of the holding member 28 arranged opposite to the edge 8a of the VIG unit 1.

Gasket arrangements 50a, 50b substantially as described in FIG. 7 or 8 are used for providing a further sealing beyond the possibly sealing functionality provided by the suspension elements 45a, 45b (dependent on if they are provided by gasket strips 40a-40d or if the comprises discrete suspension elements as previously described in relation to one or more of FIGS. 11-14), but is understood that in further embodiments of the present disclosure, only the suspension elements 45a, 45b may be present as seals.

The recesses 29 and gasket recesses 64 extends parallel in the longitudinal direction of the frame profile arrangement 20a, along the longitudinal direction LD of the edge 8a of the VIG unit 1.

The edge 8b can thermally deflect between the holding members 28a, 28b, and the gaskets 50a, 50b extends in over the free edges of the walls 28a, 28b to the VIG unit surfaces 4a, 4b.

It is generally understood that in one or more of the above and/or below mentioned embodiments of the present disclosure, the VIG unit 1 may be arranged so as to slide/move relative to one or more of the suspension elements 45a, 45b and/or relative to the holding members. This may help to allow a VIG unit to thermally deflect in the frame assembly 20 as one of the VIG glass sheets expands or contracts relative to the other glass sheet(s) when the VIG unit is subjected to a temperature difference variation. Such a temperature difference variation between the glass sheet 2a, 2b temperatures may induce a slight movement of the VIG unit edges 8a-8d in the direction of the VIG unit edges as the temperature difference varies. This may also help to accommodate for CTE (coefficient of thermal expansion) difference due to that the parts of the frame assembly is/are made from materials different from the glass sheets of the VIG unit.

It can be seen form several of the figures such as FIGS. 7, 8 and 9 described above that the edges 8a-8d of the VIG unit 1 in embodiments of the present disclosure may kept with a distance between the VIG unit edge 8a and the wall member 28c of the frame profile 28, thus providing a space 90. Hence, the VIG unit edge 8a may move/slide into or away from this provided space 90 due to differences in CTE between the glass sheets 2a, 2b and the material of the holding member 28. Also, or alternatively, the VIG unit edge 8a may move/slide into or away from this provided space 90 as the temperature difference between the VIG surfaces 4a, 4b varies, hence causing a change in the amount and/or direction of the thermal deflection of the VIG unit 1.

As can be seen, the holding member 28 may in embodiments of the present disclosure comprise one or more insulating cavities 26. This/these cavities 26 may in embodiments of the present disclosure either be left empty to comprise a gas such as air, or a selected gas pumped into the cavity 26. Alternatively, one or more of the cavities 26 may comprise an insulating material such as an insulating foam, a polystyrene material, a glass fibre insulation such as glass wool or mineral wool, it may comprise an aerogel insulating material and/or the like.

FIG. 10 illustrates a cross sectional view of a VIG unit 1 placed in a frame 20, seen in a direction parallel to the frame opening 21 provided by the frame, according to embodiments of the present disclosure. As can be seen, the VIG unit thermally deflects/bends relative to the holding members 28a, 28b, so that the distance between the outer major surfaces 4a, 4b of the VIG unit 1 and the holding members 28a, 28b/near the edge of the VIG unit varies due to a temperature difference between the VIG unit glass sheets 2a, 2b. This causes the suspension elements 45a, 45b to expand or be further compressed by the VIG unit due to the thermal deflection along the longitudinal direction LD1, LD2 of the holding members 28a, 28b and the VIG unit 1, and the amount of compression of the respective suspension element varies along the direction LD1, LD2 corresponding/according to the thermal deflection of the VIG unit edge. The amount and even direction of the thermal deflection of the VIG unit edge may change over time due to a change in the temperature difference between the VIG glass sheets 2a, 2b as e.g. previously described, and this also causes a change in the amount of compression of the seals/gaskets 45a, 45b over time.

FIG. 10 moreover illustrates a further embodiment of the present disclosure, wherein the suspension elements 45a, 45b are elongated gasket strips configured to extend in the longitudinal direction of the edge 8a-8d of the vacuum insulated glass unit land the holding part 28.

Generally, in embodiments of the present disclosure, the compression and expansion of the resilient suspension elements 45, 45b arranged at the ⅛, such as the 1/10, such as 1/12 of the length of the vacuum insulated glass unit edge nearest a corner where the respective edge terminates, is configured to be larger than the compression and expansion, respectively, of the same resilient suspension elements at a position closer to the centre 5 of the respective edge.

Figure 11:
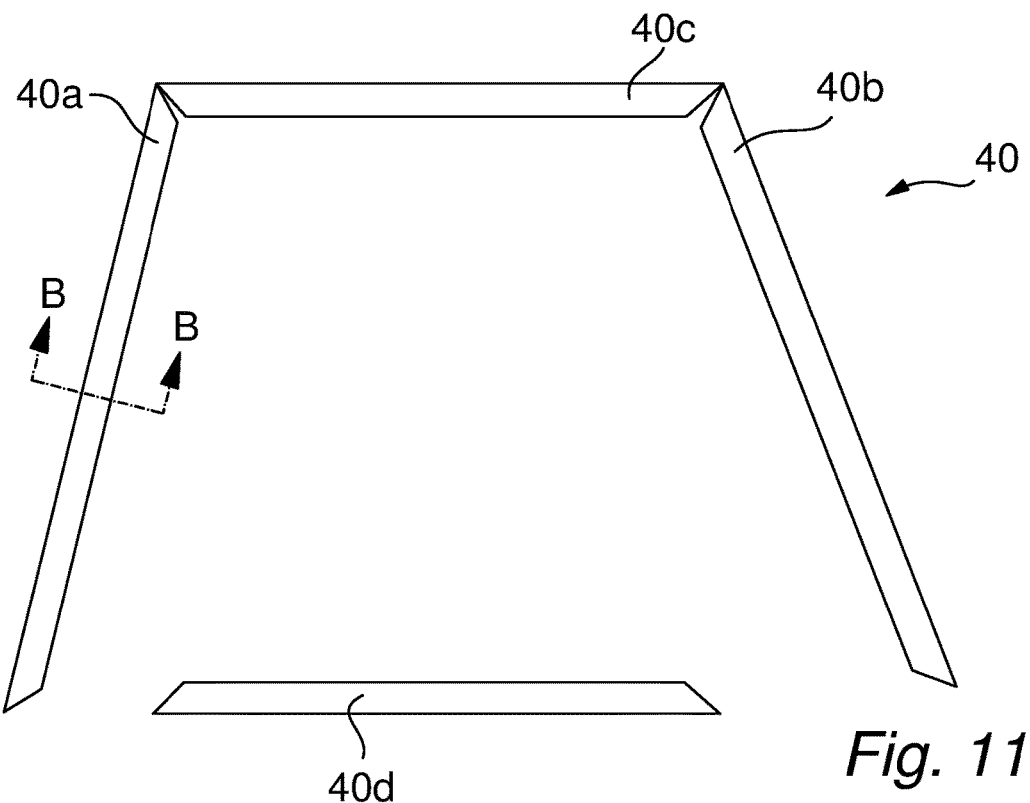

FIGS. 11 and 11B-B illustrates schematically a fixation gasket assembly 40 comprising elongated gasket strips 40a-40d for use in a VIG unit frame assembly 10 according to embodiments of the present disclosure. These gasket strips provides the suspension elements 45a, 45b. FIG. 11B-B illustrates a cross sectional view of the cutting planes B-B as illustrated in FIG. 11.

As can be seen from FIG. 11B-B, the gasket strips 40a-40d of gasket assembly 40 has/provides a C-profile providing a recess 43 for receiving the VIG unit edges 8a-8d (not illustrated in FIG. 11). The gasket assembly 40 comprises four elongated gasket strips 40a-40d, one for each VIG edge 8a-8d. Two, or as in the present example three, or four of these elongated gasket members 40a-40d may be folded around the corners of the VIG unit so that the edges of the VIG unit extend into the recess 43 of the C-profile.

The strips 40a-40d may be connected/unbroken at the corners 9 of the VIG unit, and may as illustrated comprise chamfered ends arranged to provide a substantially 90° bend at the corners between adjacent ends of the strips 40a-40d folded at the VIG corners, e.g. so that two adjacent ends of strips 40a-40d arranged at each their edge terminating at the same VIG unit corner 9 abut.

However, in some embodiments of the present disclosure, the strips 40a-40d may not be connected to each other at the corners 9 of the VIG unit 1.

The fourth strip 40d may however also be disconnected from the other as illustrated in order to be fitted appropriately at a bottom frame profile of the frame assembly 20 when installing or exchanging the VIG unit in the frame 20. However, in other embodiments, the fourth gasket 40d may be connected to one or more of the other gasket members 40a-40d, or another type of suspension element may be used. Also, in other embodiments only two or three of the gasket members 40a-40d may be used.

An end wall member 44 of the fixation gasket 40 at the recess 43 bottom connects the gasket side walls 45a, 45b and is configured to be placed opposite to the VIG unit edges 8a-8d, e.g. so as to abut the VIG unit edges 8a-8d, and the gasket side walls 45a, 45b will thus extend in over the outer surfaces 4a, 4b of the VIG unit 1.

In further embodiments, the gasket strips 45a, 45b may merely be two individual gasket strips.

Figure 12:
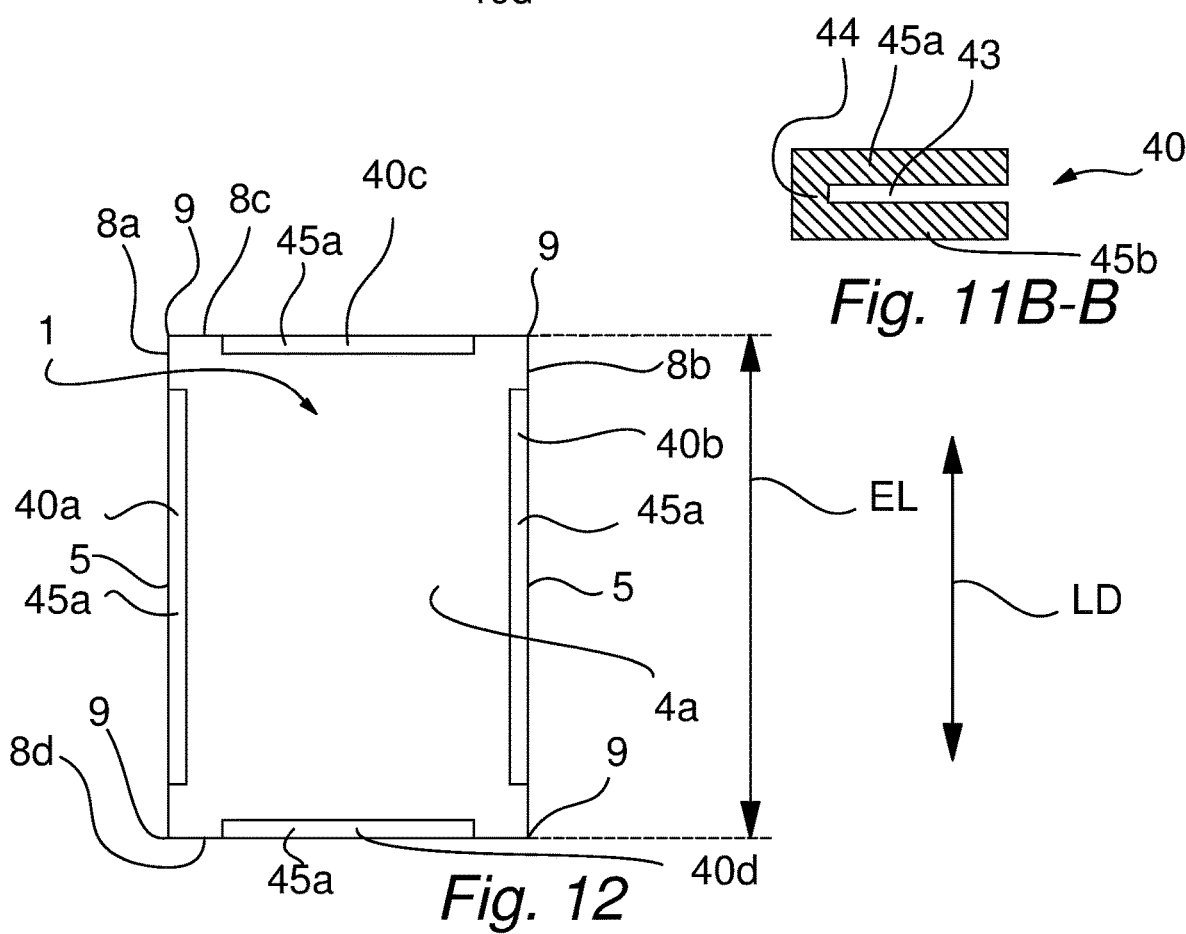

FIG. 12 illustrates schematically a VIG unit 1 according to embodiments of the present disclosure, wherein suspension elements 45a, 45b in the form of elongated gasket strips 40a-40d arranged at the edges 8a-8d of the VIG unit, and supporting on the surface 4a of the VIG unit at the edges around the circumference of the VIG unit. For improved clarity, the holding members and other parts of the frame 20 are not illustrated in FIG. 12.

In this example, the strips 40a-40d (as opposed to the embodiment illustrated in FIG. 11) are not configured to extend all the way to the corners 9 of the VIG unit. Rather, the suspension elements 45a, 45b are arranged to support the centre portion of the VIG unit edge and in both direction towards the corners where the respective edge terminates. The strips 45a, 45b terminates at a distance before the corner 9 of the edge, and thus, no fixation gasket/suspension element may be arranged at the ⅛, such as the 1/10, such as 1/12 of the length EL of the edge nearest a corner 9 where the respective edge terminates.

In embodiments of the present disclosure, the holding members 28a, 28b extending along the VIG unit edge, and/or the suspension elements 45a, 45b, may extend at least 40%, e.g. at least 60%, such as at least 80%, for example at least 95%, such as substantially the entire length of the respective edge of the VIG unit.

Figure 13:
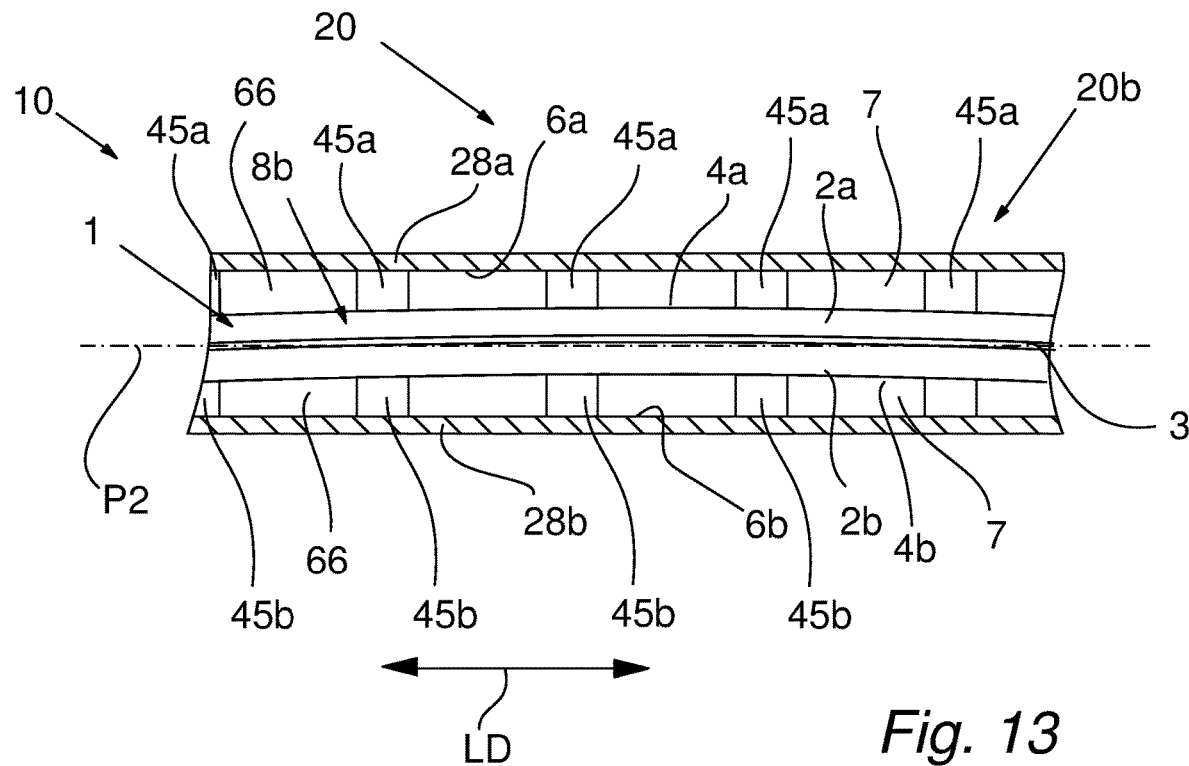

FIG. 13 illustrates schematically a cross sectional view towards an edge 8b of the VIG unit according to an embodiment of the present disclosure. Herein, a plurality of discrete suspension element blocks 45a, 45b are arranged at each side of the VIG unit 1 so as to suspend the VIG unit between the holding members 28a, 28b as e.g. previously explained.

A plurality of discrete resilient suspension elements 45a are distributed in the longitudinal direction LD of the VIG unit edge 8b, and are compressed between the holding member 28a and the outwardly facing surfaces 4a of the VIG unit.

A plurality of further discrete resilient suspension elements 45b are distributed in the longitudinal direction LD of the VIG unit edge 8b, and are compressed between the holding member 28b and the opposite outwardly facing surfaces 4b.

This causes the VIG unit to be suspended between the holding members 28a, 28b, thus providing the space 66 between the VIG unit and the respective holding member.

As can be seen, the discrete suspension elements 45a, 45b may be arranged substantially opposite to each other, so that the same area of the VIG unit is supported suspension elements 45a, 45b at opposing surfaces 4a, 4b. However, in other embodiments (not illustrated) the suspension elements 45a, 45b may be arranged staggered.

When the VIG unit thermally deflects due to a temperature difference between the VIG unit glass sheets 2a, 2b, this causes an expansion of some of the discrete suspension elements, and further compression of others of the suspension elements 45a, 45b.

It is understood that in embodiments of the present disclosure, the spaces 7 between the discretely arranged, resilient and compressed suspension element blocks may either be kept empty, be filled with a desired gas and/or be filled with a resilient insulating material (not illustrated) such as an insulating foam, a polystyrene material, a glass fibre insulation such as glass wool or mineral wool, it may comprise an aerogel insulating material and/or the like to improve the insulating capabilities of the frame 20.

FIG. 14 illustrates an embodiment of the present disclosure, wherein a combination of the embodiments described in relation to FIGS. 13 and 14 respectively, are used. Hence, discretely arranged suspension elements 45a are arranged at one side 4a of the VIG unit, whereas a substantially continuous, elongated gasket 40 providing a compressed suspension element 45b is arranged at the other surface. The elastic modulus/modulus of elasticity of the suspension elements 45a, 45b may in this embodiment be different, the uncompressed height of the suspension elements may be different and/or the like. This may e.g. be provided in order to adjust for that the gasket 40, 45b may have a larger contact area for providing a holding/fixation force than the sum of the contact area of the distributed suspension elements 45a.

Figure 15A:
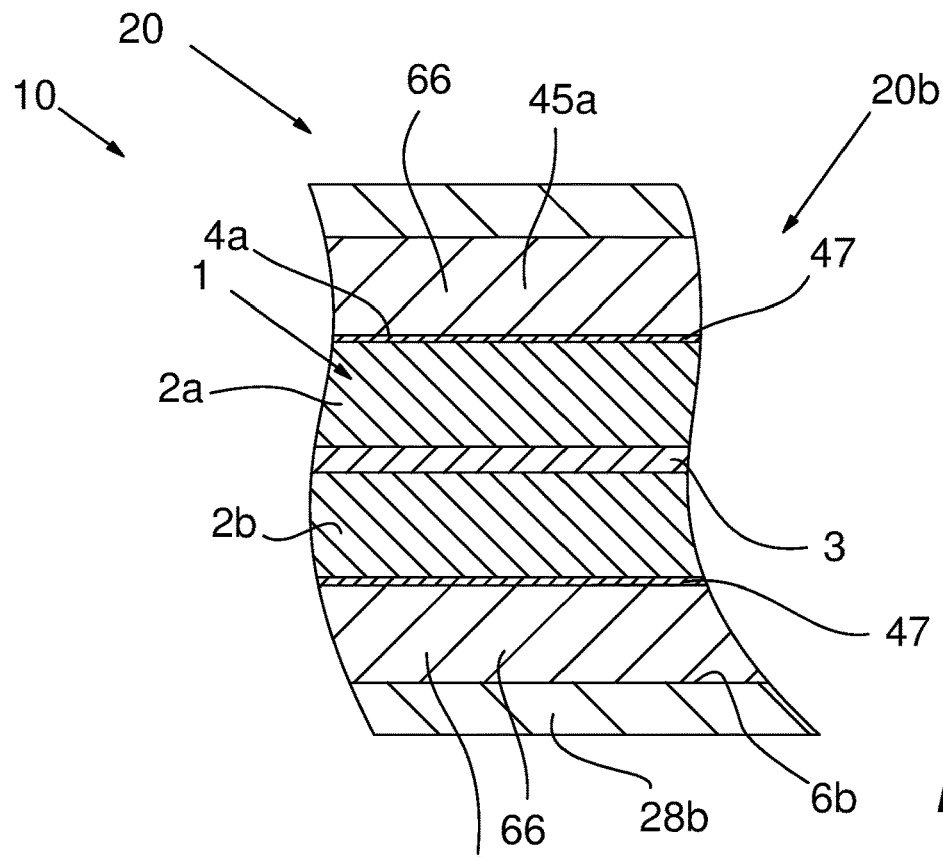

FIG. 15a illustrates a cross sectional view through the VIG unit 1 and the edge sealing 3, in the longitudinal direction of the edge sealing. Here the suspension elements 45a, 45b are elongated gasket strips, but it may also in further embodiments of the present disclosure be discretely arranged, compressed suspension elements, see e.g. FIG. 14 or 15. The compressed suspension elements 45a, 45b are attached to the surfaces 4a, 4b of the VIG unit 4a, 4b by means of an adhesive layer 47 such as a glue, an adhesive tape and/or the like, to e.g. improve the connection between the VIG unit and the suspension element.

The suspension elements 45a, 45b may be flexible/resilient enough to take up any relative movement between the VIG unit and holding members in the longitudinal direction LD or in other directions due to a change in a thermal deflection or difference in coefficient of thermal expansion (CTE) of the parts of the assembly 10.

Figure 15B:
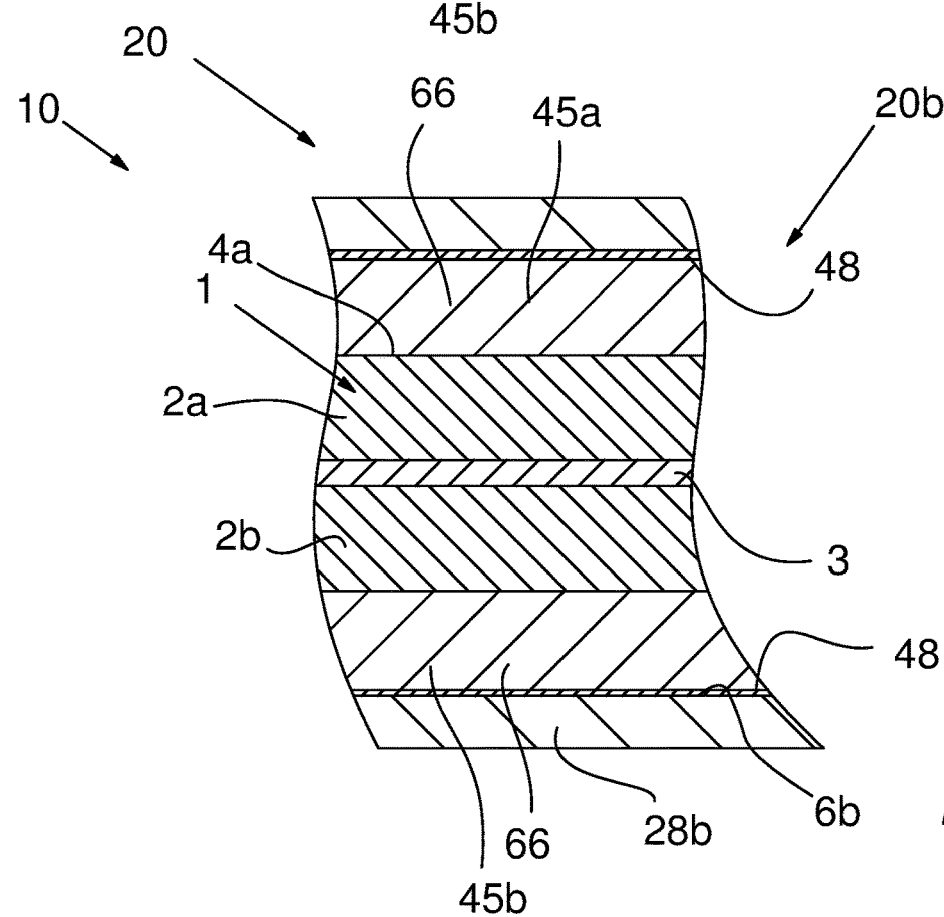

FIG. 15b illustrates a cross sectional view through the VIG unit 1 and the edge sealing 3, in the longitudinal direction LD of the edge sealing. Also here, the suspension elements 45a, 45b are elongated gasket strips, but it may also in further embodiments of the present disclosure be discretely arranged, compressed suspension elements, see e.g. FIG. 14 or 15. The compressed suspension elements 45a, 45b are attached to the surfaces 6a, 6b of the holding members 28a, 28b by means of an adhesive layer 48 such as a glue, an adhesive tape and/or the like, to e.g. improve the control of the position of the suspension element 45a, 45b before the VIG unit 1 is placed between the (hence uncompressed) suspension elements 45a, 45b, and/or after the VIG unit 1 is placed between the (hence pre-compressed) suspension elements 45a, 45b.

In further embodiments of the present disclosure, both of the adhesive layers 47 and 48 as illustrated in FIGS. 15a and 15b may be provided. It is understood that the adhesive layers 47, 48 may be a continuous adhesive layer, or an adhesive layer comprising adhesive dots or strips.

Figure 16:
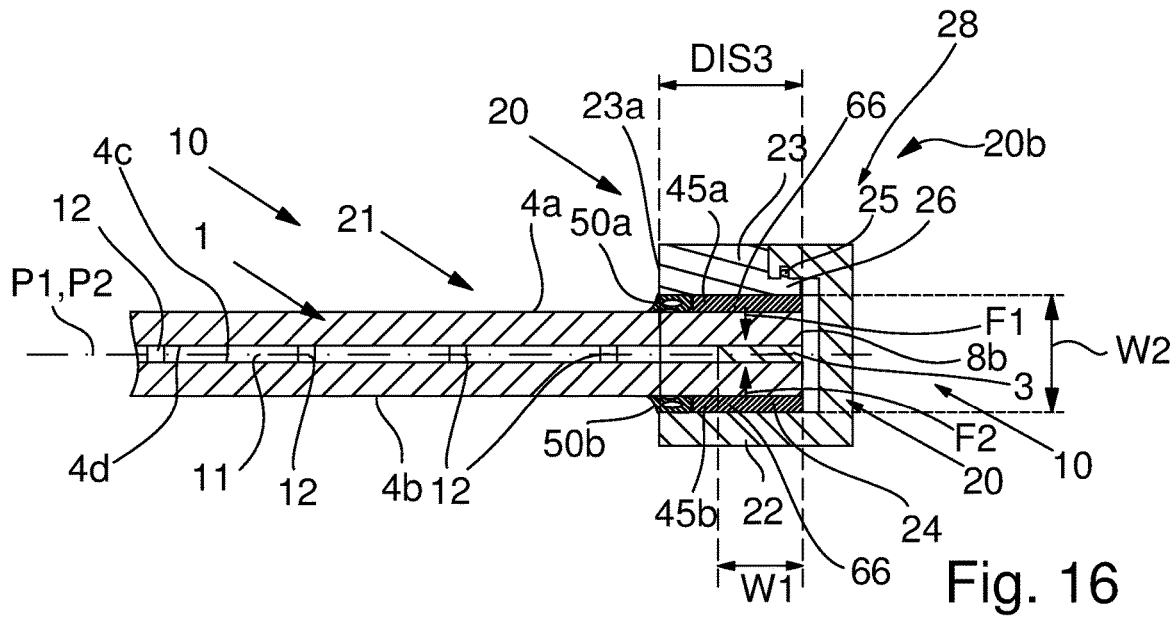

FIG. 16 illustrates schematically a cross sectional view of a VIG unit 1 frame assembly 10 with a base member/glazing member solution according to embodiments of the present disclosure.

It is generally understood, that in embodiments of the present disclosure, the frame 20 may overlap the VIG unit edges (in FIG. 16 the edge 8b is illustrated) by a certain amount/distance DIS3. This may help to provide an improved insulation performance of the VIG unit frame assembly 20, as the edge seal 3 material such as a metal material or a solder glass material, for example a low melting point solder glass, may provide a "cold bridge" at the VIG unit edge where it seals the gap 11.

The distance DIS3 may in embodiments of the present disclosure be at least two times the width W1, such as at least three times the width of the edge seal 3, measured along an inner surface facing the gap of one of the VIG glass sheets in a direction perpendicular to the nearby edge 8b. In embodiments of the present disclosure, the distance DIS3 is between two and five times the edge seal width W1.

For example, the overlap DIS3 may in embodiments of the present disclosure be between 10 mm and 50 mm, such as between 20 mm and 40 mm.

The distance DIS3 may be measured along an outer surface 4a, 4b from the edge 8b to the position where the frame assembly 20 ends and a view through the VIG unit 1 glass sheets 2a, 2b is possible. In the present example, it may be measured between the edge 8b and the surface 23a of the frame facing the frame opening 21 or between the edge 8b and edge of the gasket 50a most distal to the edge 8b (see FIG. 20).

It is understood that in further embodiments of the present disclosure (not illustrated in FIG. 16), the outwardly facing surface of the VIG unit 1 to face away from a temperature controlled room such as a room in a building (or a temperature controlled cavity in a freezer or a refrigerator) may either be less overlapped by the frame than the other surface, such as surface 4a, to face the room. This may e.g. be provided at one or more sides of the VIG unit at e.g. the bottom edge, top edge and/or side edges of the VIG unit.

It is generally understood that in one or more embodiments of the present disclosure, the frame profile arrangements 20a-20d may comprise a base member 22 and a glazing member 23. These may be elongated profiles made by means of e.g. an extrusion manufacturing process, a pultrusion manufacturing process, a moulding manufacturing process and/or the like. The material of the profile(s) 22, 23 may e.g. be a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles of the frame may be made from a metal such as aluminium, and/or a wood material such as core wood or glued laminated wood material. These profiles may extend continuously between the corners of the frame 20. One frame example can be an aluminium profile with polymer interconnection between the interior and exterior to add a thermal break. Another frame example according to the present disclosure may be a polymer profile with hollow chambers and reinforcements inside the hollow chambers for adequate strength. Another frame example is a compound frame of wood combined with a non-wood profile.

The glazing member 23 and base member together provides a recess 24 into which the VIG unit edge 8b extend.

Figure 17:
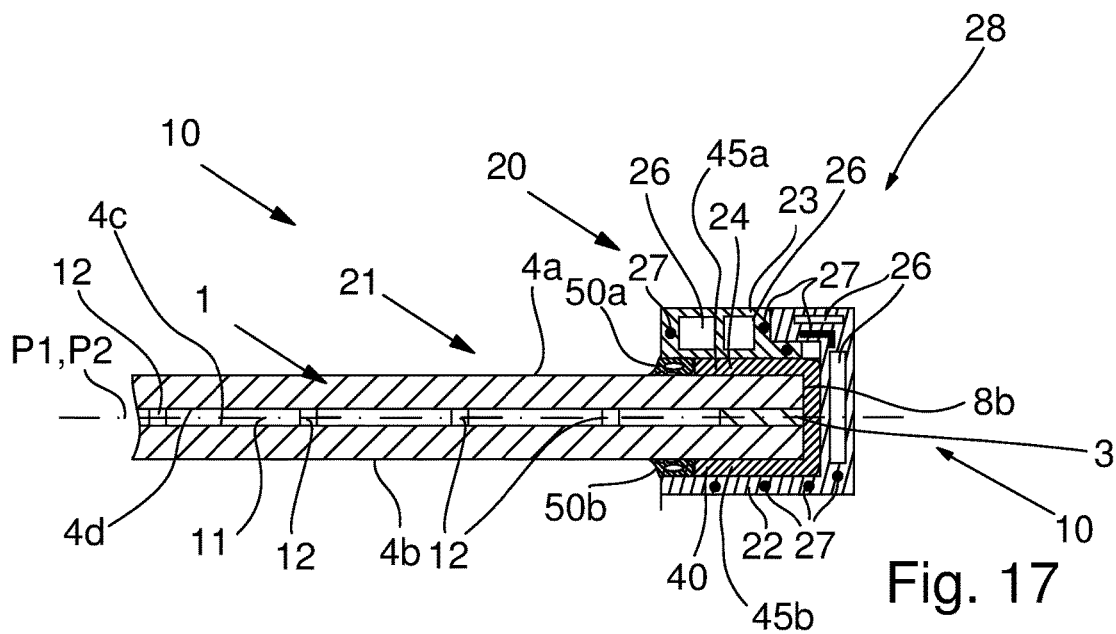

One or more of the frame profiles, 22, 23 of the frame may either be substantially solid, see e.g. FIG. 16, or comprise internal insulating cavities 26, see e.g. FIG. 17, illustrating schematically a cross sectional view of a part of the frame 20 holding the VIG unit according to embodiments of the present disclosure. In FIG. 14, both the glazing member 23 and the base member 22 comprises such cavities 26. These cavities may be obtained during the production of the profiles 22, 23, and may extend in the longitudinal direction of the profiled 22, 23 inside the profiles 22, 23.

The cavity or cavities 26 may in embodiments of the present disclosure either be left empty to comprise a gas such as air, or a selected gas pumped into the cavity 26. Alternatively one or more of the cavities 26 may comprise an insulating material such as an insulating foam, an expanded polystyrene material, a glass fibre insulation such as glass wool or mineral wool, it may comprise an aerogel insulating material and/or the like.

FIG. 17 moreover illustrates a further embodiment of the present disclosure, wherein the frame profiles 22, 23 comprises strengthening/reinforcing members 27 embedded in the profiles 22, 23, e.g. by means of a co-manufacturing such as co-extrusion or co-pultrusion. These may have any suitable shape, extends in the longitudinal direction of the profiles and helps to improve/increase the rigidity and strength of the frame members 22, 23.

The further sealings/gaskets 50a, 50b illustrated in FIG. 16, 17 or other of the previously described figures may in embodiments of the present disclosure be separate and removable from the frame 20, but in other embodiments of the present disclosure (not illustrated), the sealings/gaskets 50a, 50b may be co manufactured such as co-extruded or co-pultruded together with the base member 22 and/or the glazing member 23, or the profile 28 as described previously.

As illustrated in FIG. 16-17, the suspension elements 45a, 45b are arranged in the recess 24 between the base member 22 and the glazing member 23, and the VIG unit 1 respectively. The suspension element 45b is compressed between the base member 22 and VIG unit surface 4b, and suspension element 45a is compressed between the glazing member 23 and VIG unit surface 4a respectively as e.g. explained previously. This causes the suspension elements to provide the holding force F1, F2.

As can be seen, the base member 22 may extend from a position opposite to the major surface 4b of the VIG unit 1 and around the edge 8b, and e.g. also to be at least partly opposite to a part of the surface 4a, but it may also In other embodiments extend only from a major surface 4b of the VIG unit and around the edge 8b, and not extend to the oppositely directed surface 4a of the VIG unit The width W2 of the recess 24 provided between members 22, 23 may in embodiments of the present disclosure be configured to substantially not change when the VIG unit edge 8b thermally deflect to describe an edge deflection curve as described above, but in other embodiments, it may be allowed to vary as e.g. previously explained, during thermal deflection of the VIG unit. The width W2 is larger than the thickness of the part of the VIG unit edge extending into the recess 24, and hence, a predefined space 66 may in embodiments of the present disclosure (ref no. 66 however not illustrated in FIG. 16) be provided between the outer surface 4a, 4b of the glass sheets 2a, 2b of the VIG unit 1, and a frame profile member 22, 23. The VIG unit 1 can thermally deflect in this space 66 so as to describe the previously described "deflection curve" of the edge 8b in the recess 24.

In embodiments of the present disclosure, the resilient gasket 50a, 50b may have a thickness above 4 mm, such as above 5 mm, for example above 6 mm at a temperature difference between the VIG unit glass sheets of substantially 0° C. This thickness may in aspects be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

One or more members of the frame 20, such as the base member 22 and glazing member 23, or the base member alone, may in embodiments of the present disclosure thus help to provide a counter force when the VIG unit thermally deflects, and may in further embodiments of the present disclosure help to provide a restriction towards the thermal deflection of the VIG unit. This may e.g. be provided within one or more temperature ranges of the temperature difference ΔT, e.g. at more extreme temperature differences such as temperature differences above 40° C. or above 65° C.

As can be seen in FIG. 16, the glazing member 23 may be connected and fixed to the base member 22 by means of a connection 25. This connection 25 is a tongue and groove connection, but it may also be a snap connection and/or the like. Alternatively or additionally, the glazing member 23 may be connected to the base member 22 by means of other releasable mechanical fastening means such as screws or nails, and/or by means of chemical fastening means such as an adhesive.

In embodiments of the present disclosure, the compression of the suspension element 45a may help to keep the glazing member 23 in place relative to the base member 22, e.g. by pressing towards a part 26 of the glazing member 23 arranged between the base member 22 and the suspension element as illustrated in FIG. 16. This may help to provide a holding force or keep a connection arrangement 25 such as a tongue or groove the glazing member in place relative to a groove or tongue in the base member.

When removing the glazing member (if possible), the suspension element(s) may be removed and then the VIG unit may be dismantled from the frame 20.

As previously described, the VIG unit may thermally deflect/bend relative to the frame profiles 22, 23, so that the distance between the outer major surfaces 4a, 4b of the VIG unit and the frame profiles 22, 23 at/near the edge of the VIG unit changes. This causes the further seals or gaskets 50a, 50b (see previous description) to expand or be compressed by the VIG unit 1 due to the thermal deflection along the longitudinal direction LD1 of the frame profiles 22a, 22b and the VIG unit. Hence, as the amount and even direction of the thermal deflection of the VIG unit may change over time due to a change in the temperature difference between the VIG glass sheets 2a, 2b as e.g. previously described, the amount of compression of the further seals/gaskets 50a, 50b may also change over time.

As can be seen in e.g. FIGS. 7-9 and 16-17 the further resilient gasket or seal members 50a, 50b, 60a, 60b, 61 may be arranged between the frame opening 21 and the first suspension elements 45a, 45b, to provide a water and/or air tightening of the recess 24, 29 and spaces 66.

It is generally understood that in one or more embodiments of the present disclosure, in case the suspension elements 45a, 45b are continuous gasket strips, one or both of the further gaskets/seals 50a, 50b, 60a, 60b, 61 as described above or below may be omitted, and the suspension elements 45a, 45b may thus provide a sufficient air and/or water tightening between VIG unit 1 and frame 20 at one or both sides of the VIG unit 1.

Figure 18:
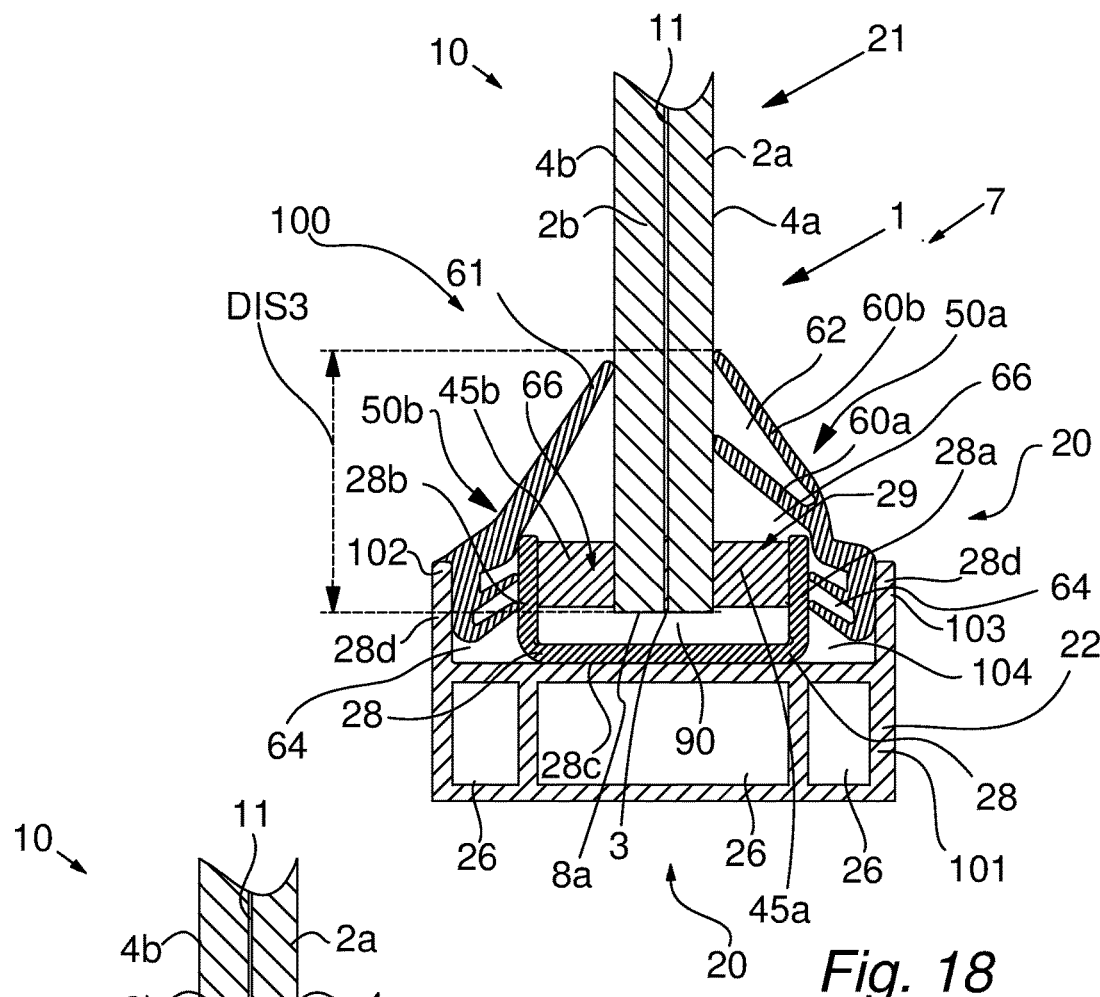

FIG. 18 illustrates schematically a cross sectional view of a retro-fitting solution 100 according to embodiments of the present disclosure for retrofitting a vacuum insulated glass unit 1 to a frame 101 originally designed for gas insulated glass panes of larger thickness than the vacuum insulated glass unit. The frame 101 may either be a frame provided at a frame part manufacturing site, or may be an existing frame where the gas filled and thicker glass pane is replaced.

The retro fitting solution 100 comprises resilient, elongated tightening seals or gasket arrangements 50a, 50b, 60a, 60b, 61 as described in relation to one or more of the embodiments described in relation to one or more of the figures above.

The retro fitting solution 100 moreover comprises suspension elements 45a, 45b as e.g. previously disclosed, e.g. in form of a plurality of discrete suspension elements or in the form of gasket strips.

In the present example of FIG. 18, the gasket parts/lips 60, 61a, 61b are configured to deflect to follow a deflection of the vacuum insulated glass unit edge when it thermally deflect and describes the bending curve as described above, to provide a substantially watertight and/or airtight tightening of a space 66 between the one or more frame profiles 28a, 28b and the outer surfaces 4a, 4b of the vacuum insulated glass unit 1 when installed at the frame 101.

The frame 101 comprises a recess 104 provided between two walls 102, 103 of the frame 101.

A profile member 28 of the retro-fitting system 100 provides an U-shape between the holding members 28a, 28b, and is placed in this recess/slit 104 and is fixated to the frame 101 for example by means of mechanical fasteners such as screws, fixation clips, a snap connection or the like, by means of an adhesive or by means of a wedging force (not illustrated in FIG. 18).

The edge 8a of the VIG unit 1 extends into the recess 29 provided by the U-shape of the profile 28 of the retro fitting system 100. The compressed, resilient suspension elements 45a, 45b as previously described in relation to various embodiments of the present disclosure is/are placed in the recess 29 so as to fixate and suspend the vacuum insulated glass unit 2 between the holding members 28a, 28b.

Gaskets 50a, 50b are placed between the walls 102, 103 of the frame 101 and the elongated profile members 28a, 28b of the profile 28, and comprises resilient elongated lips/flaps 60a, 60b, 61 extending to the VIG unit surfaces 4a, 4b. The lip 61 may be configured to provide a water tightening so as to reduce or prevent e.g. rain water from entering the mentioned recesses 28 in the profile 28 attached to the existing frame 101. The lips 60a, 60b may help to provide an air tightening.

In FIG. 18, the profile walls 102, 103 of the frame 101 are an integrated part of a frame profile but one or more of the walls 102, 103 may also be separate members, for example provided by means of a glazing member and base member as e.g. described in relation to FIG. 16 or 17.

As can be seen, the profile 28 provides three parallel recesses in the existing frame 101 after it has been installed, i.e. the recesses 64 between the wall 102, 103 of the exiting frame and the walls 28a, 28b of the profile 28, and the recess 29 provided between the walls 28a-28b. These recesses extend in the longitudinal direction of the profiles 28, 101 and thus also in the longitudinal direction of the VIG 1 edge 8a. The recesses 64 are in the present example used for attachment of gasket arrangements 50a, 50b, but one or both of the recesses 64 may alternatively in further aspects of the present disclosure also be used for attachment of a glazing profile 23, e.g. to provide a glazing profile solution as disclosed in e.g. one or more of FIGS. 16, 17 at one or both sides of the VIG unit.

Figure 18A:
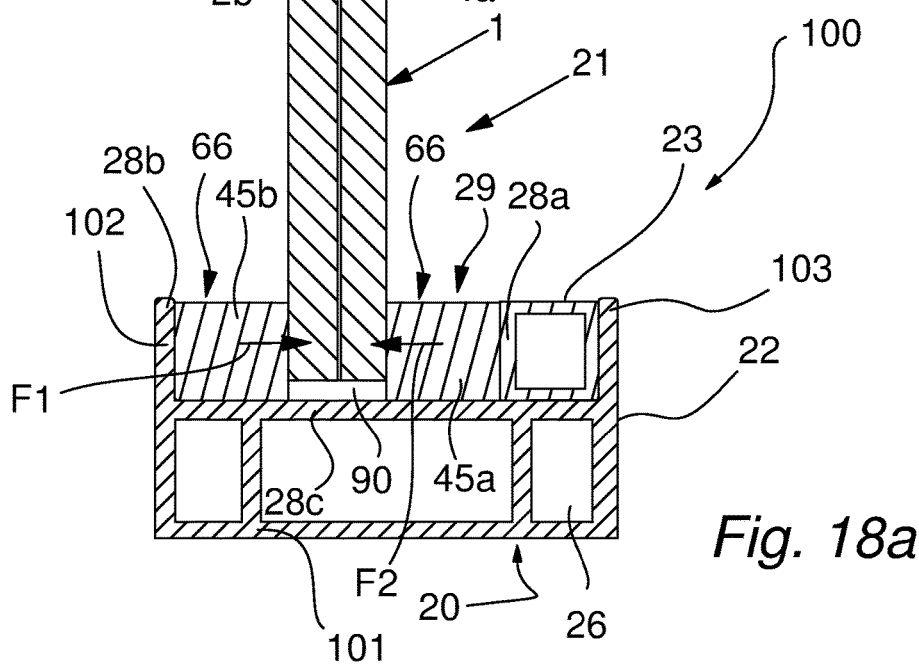

FIG. 18a, illustrates a further embodiment of a retro fitting frame solution 100 according to embodiments of the present disclosure. Here the resilient suspension element(s) 45b is/are provided and compressed in the space 66 between a wall 102 of the frame profile 101 and the VIG unit surface 4b. At the other side, a glazing member 23 in the form of an elongated spacer (e.g. hollow to obtain improved heat insulation or alternatively a solid glazing member) is placed between the wall 103 of the frame profile 101 and the other suspension element(s) 45b. Hence, the space 66 is provided between the member 43 and the VIG unit surface 4a, and the other suspension element(s) 45b is/are provided in this space 66. Accordingly, in FIG. 18a, one of the walls 102 of the frame 101 provides a holding member 28b, whereas the elongated profile 23 provides the other holding member 28a. In still further embodiments (not illustrated) the compressed suspension element(s) 45a may extend between wall 102 of the frame and the VIG unit surface 4a.

It is understood that the suspension elements 45a, 45b may either provide a sufficient tightening of the recess 29, or gaskets such as e.g. gaskets 50a, 50b described above or below may be provided (not illustrated in FIG. 18a).

Figure 19:
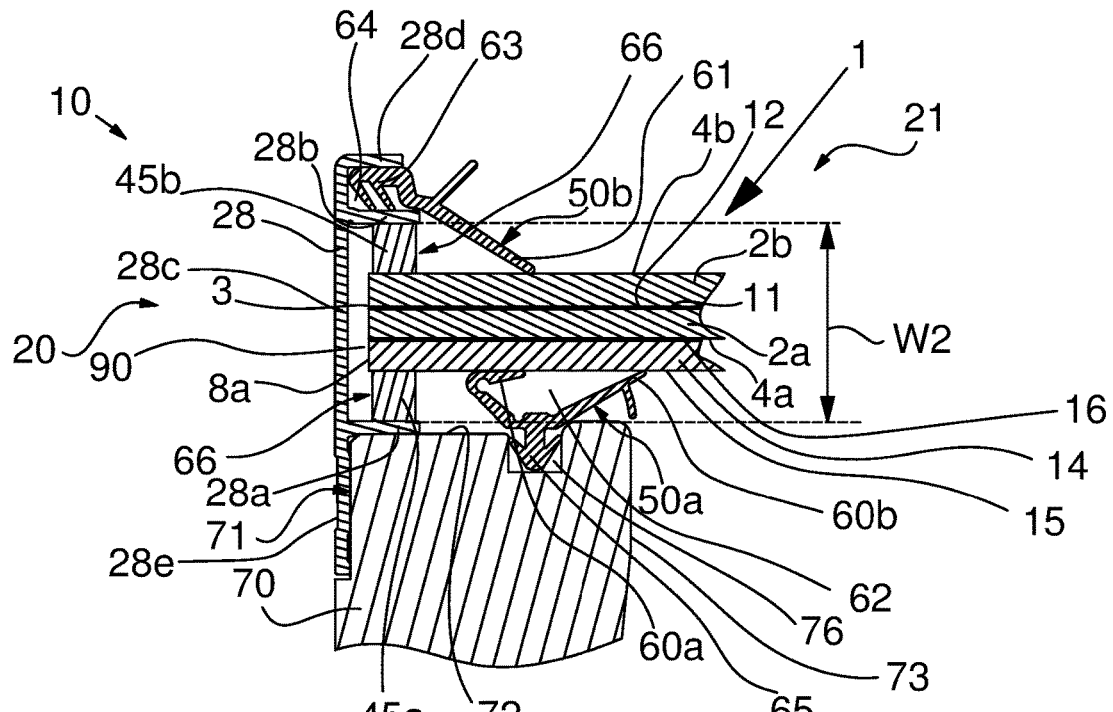
Figure 20:
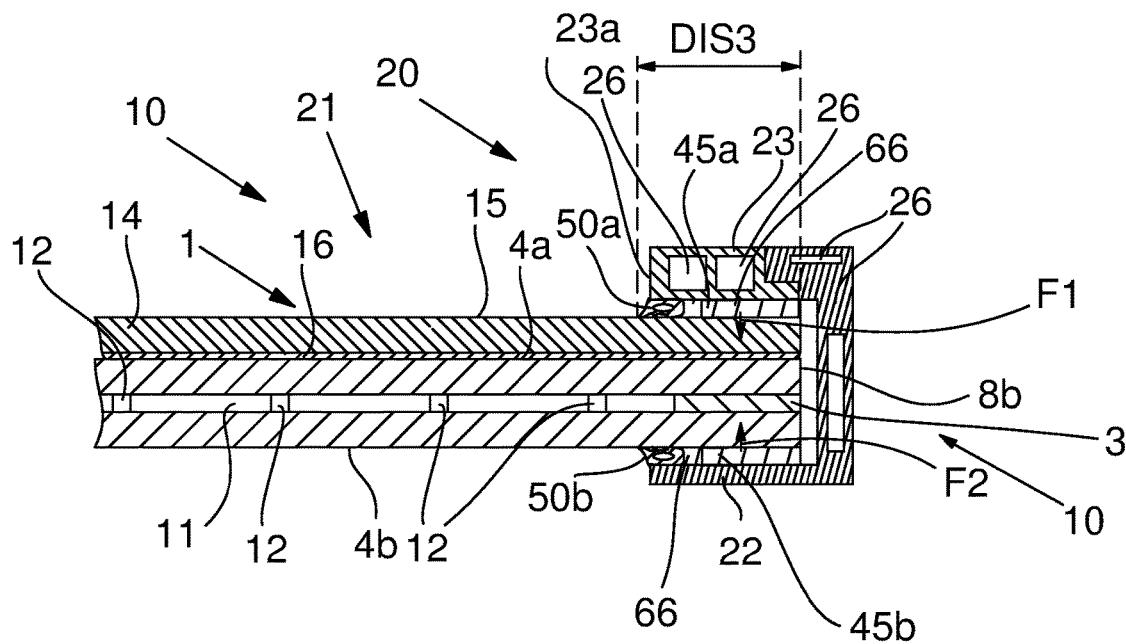

FIGS. 19 and 20 illustrates a laminated VIG unit arranged in a frame assembly according to various embodiments of the present disclosure, but where the VIG unit is laminated.

The frame solution 20 in FIG. 19 substantially corresponds to the frame solution according to FIG. 8, however where the VIG unit 1 is laminated with a lamination glass sheet 14, such as an annealed glass sheet or a tempered glass sheet. This is laminated to an outer major surface 4a of the VIG glass sheet 2a providing a major surface on which the support structures 12 support in the gap 11. The lamination glass sheet 14 is laminated to the VIG glass sheet 2a by means of a lamination layer 16 such as a polyvinyl butyral (PVB) or ethylene-vinyl acetate (EVA) layer. The lamination glass sheet 14 thus provides the outer major surface 15 of the glass sheet.

The suspension elements 45a, 45b may thus be arranged to abut the outer surface 15 of the laminated glass sheet 14. The distance between the holding members 28a, 28b is thus adjusted to the increased VIG unit 1 thickness provided by the lamination glass sheet 14 and the lamination layer 16.

The lamination glass sheet 14 may in embodiments of the present disclosure, as illustrated, be configured to face the interior of the building. However, in other embodiments, it may be arranged in the frame to face the exterior of the building.

The frame solution 20 in FIG. 20 substantially corresponds to the frame solution according to e.g. FIG. 16 or 17, where a glazing member 23 and a base member 22 of one or more of the frame profile arrangements 20a-20d are connected by connection 25 and/or by means of screws, nails or the like. These 22, 23 form a recess 24 for receiving the edge of the VIG unit 1. Again, the VIG unit in FIG. 20 is laminated by a lamination glass sheet 14 as e.g. explained above.

The edge of the VIG unit glass sheets 2a, 2b and the lamination glass sheet 14 extend into the recess 24 in the frame 20 provided between the base member 22 and the glazing member 23.

The suspension system in the form of the compressed, resilient suspension element or elements 45a in this embodiment support the VIG unit 1 at an outer surface 4b of a VIG glass sheet 2b such as a tempered glass sheet, e.g. a thermally tempered glass sheet. The support structures 12 in the gap 11 support at the major surface of this glass sheet 2b facing the gap 11 to maintain the gap 11 between the glass sheet 2b and a further (e.g. also tempered) glass sheet 2a between which the gap 11 is provided. Also, the suspension system in the form of the compressed, resilient suspension element or elements 45b support the VIG unit 1 at the oppositely directed outer surface 15 of the laminated glass sheet 14.

It is generally understood that the size of the lamination glass sheet 14, i.e. the width and/or height may be substantially equal to the size of the glass sheet 2a of the VIG unit to which it is attached by the lamination layer 16.

Though, in further embodiments of the present disclosure, the size (width and/or height) of the lamination glass sheet 14 may be reduced compared to the width and/or size of the VIG unit glass sheet to which it is attached. This is illustrated in a cross sectional, schematic view in FIG. 21.

Here, the resilient, compressed suspension elements 45a, 45b are configured to suspend the VIG unit 1 at the outwardly facing major surfaces 4a, 4b of the glass sheets 2a, 2b providing the major surfaces 4c, 4d facing the gap 11. The lamination glass sheet's 14 narrow edge 17 extending between the major surfaces of the lamination glass sheet 14 faces the frame 20 surface 23a, in the present embodiment it faces the glazing member 23. The edge 17 thus is arranged opposite to the edge/surface 23a of the frame facing the frame opening 21.

In the present example, the surface of the frame 18 facing in the same direction as the lamination glass sheet surface 15 is substantially flush with the surface 15, but in other embodiments, this may not be the case, and the lamination glass sheet surface 15 may either extend beyond the frame surface 18 facing away from the frame opening plane, or the surface 15 may not extend all the way to the level of surface 18. The part of the frame at the side of the lamination glass sheet 15 may thus be considered counter sunk compared to the outer surface 15 of the lamination glass sheet 14, with a depth corresponding to the lamination glass sheet thickness and possibly also the lamination layer thickness (as illustrated in the present embodiment). The lamination glass sheet 14 of reduced size may help to reduce the thickness of the frame compared to if the frame should extend over the entire thickness of all glass sheets 2a, 2b, 15 and the gap 11 and lamination layer 16. As can be seen, a gasket such as a rubber gasket, a silicone sealing or the like 19 may be placed between the lamination glass sheet and the frame, in the present example the glazing member 23. The gasket 50a may thus either be maintained to improve water and/or air tightness, or be omitted if the gasket 19 is considered sufficient.

Figure 22:
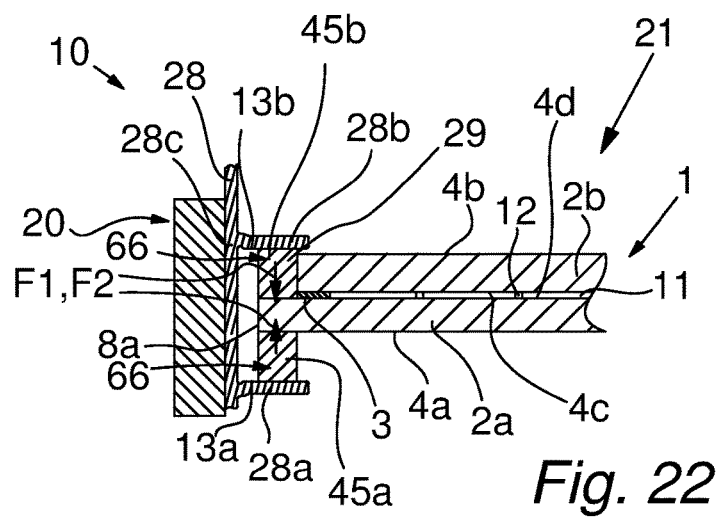

FIG. 22, illustrates schematically a cross sectional view of the VIG unit frame assembly 10 according to embodiments of the present disclosure. The compressed resilient suspension elements 45a, 45b holds the VIG unit 1 at one glass sheet 2a of the VIG unit between the holding members 28a, 28b e.g. by clamping forces F1,F2 as illustrated, substantially in the same way as disclosed in relation to various embodiments disclosed above.

However, the glass sheet 4a is larger than the glass sheet 4b, hence providing an exposed major surface 4d of the glass sheet 2a which also faces the evacuated gap 11 at the other side of the sealing 3. Accordingly, the compressed suspension elements 45a, 45b are connected to and suspends the VIG unit 1 at the opposite surfaces 4a, 4d of the glass sheet 4a, 4b, but still so that the VIG unit edge 8a may deflect thermally as disclosed previously. Even though gasket arrangements 40, 50a, 50b, 61, 60a, 60b are not disclosed in FIG. 22, these may naturally also be provided as e.g. previously disclosed in relation to various embodiments of the present disclosure.

Figure 21:
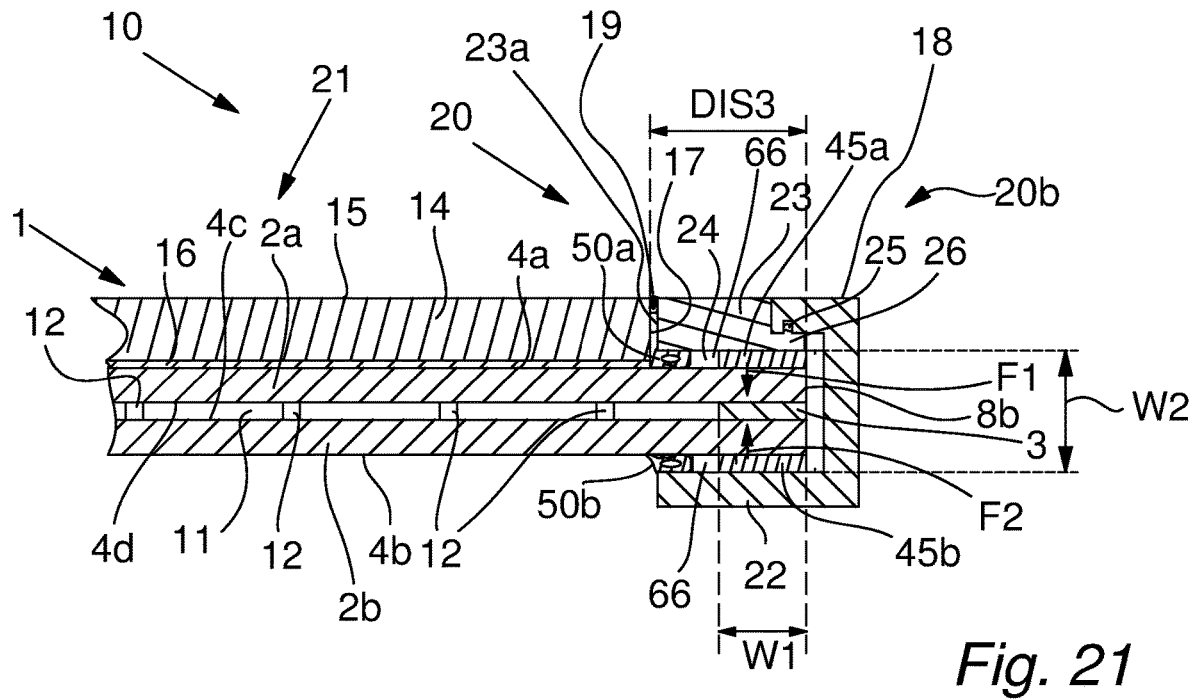

It is naturally to be understood that an embodiment as disclosed in FIG. 21 may also be used for an un-laminated VIG unit as disclosed in FIG. 22, in further embodiments of the present disclosure, so that the frame surface 23a facing the frame opening 21 extends to face the end edge of the VIG unit 1 glass sheet 2b which is not held by the suspension assembly. The VIG glass sheet 2b of reduced size may thus help to reduce the thickness of the frame compared to if the frame 20 should extend over the entire thickness of all glass sheets 2a, 2b and the gap 11.

Figure 23:
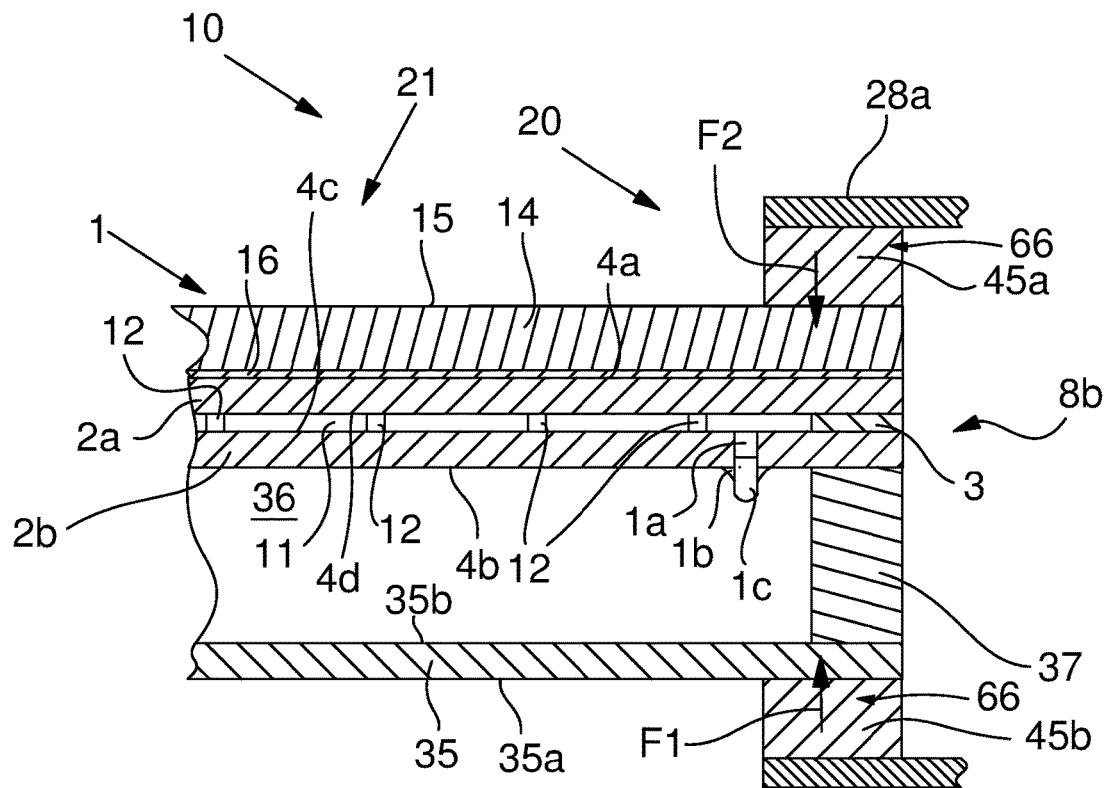

FIG. 23 illustrates an embodiment of the present disclosure where the VIG unit 1 is a so to say hybrid VIG unit comprising three glass sheets 2a, 2b, 35. This VIG unit comprises glass sheets 2a, 2b paired to provide an evacuated gap 11 comprising distributed support structures between these glass sheets 2a, 2b as explained above in relation to e.g. FIG. 2. The hybrid VIG unit 1 moreover comprises a further glass sheet 35 providing a further gap 36 between the major surface 4b of the glass sheet 2b facing away from the evacuated gap 11, and this gap 36 is sealed by means of a gas-space edge seal 37. The VIG glass sheets 35, and 2b respectively thus forms a gas IG (Insulated glass) unit where a gas such as Argon or any other suitable gas may be provide in the space 36 for insulating properties to slow the transfer of heat through the VIG unit.

As can be seen, an evacuation hole 1a in glass sheet 2b comprises a sealing system 1b, 1c in the form of a sealed evacuation port such as a tube 1c, and a sealing material 1b such as solder glass or metal solder for sealing the connection between tube 1c and glass sheet 2b. The tube 1c has been used to evacuate the gap 11. This system 1b, 1c may in embodiments of the present disclosure extend into the space 36, and is hence protected.

As can be seen from FIG. 23, a lamination glass sheet 15 may be laminated 16 to the glass sheet 2a of the VIG unit in embodiments of the present disclosure, see e.g. description of FIGS. 19, 20 and/or 21.

The resilient compressed suspension elements holds the VIG unit 1 between the holding members 28a, 28b at the outer surface 15 of the lamination glass sheet 14 and the outer surface 35a of the glass sheet providing an inner major surface 35b to the gas-filled space 36. In further embodiments of the present disclosure, a solution where e.g. the glass sheet 35 or lamination glass sheet 14 is smaller in width and/or height than the VIG unit glass sheets 2a, 2b may be utilized, e.g. as illustrated in FIG. 21. Hence, the frame may extend into the space provided due to this reduced size.

A coating, for example low-e coating (not illustrated), may in embodiments of the present disclosure be placed at one or more of surfaces 4c, 4d, 4b and/or 36b.

It is noted that even though parts of the frame 20 assembly have been omitted from FIGS. 23 (and 24) for simplicity, a frame solution as described in relation to any of the previous figures may be used in one or more aspects of the present disclosure.

Figure 24:
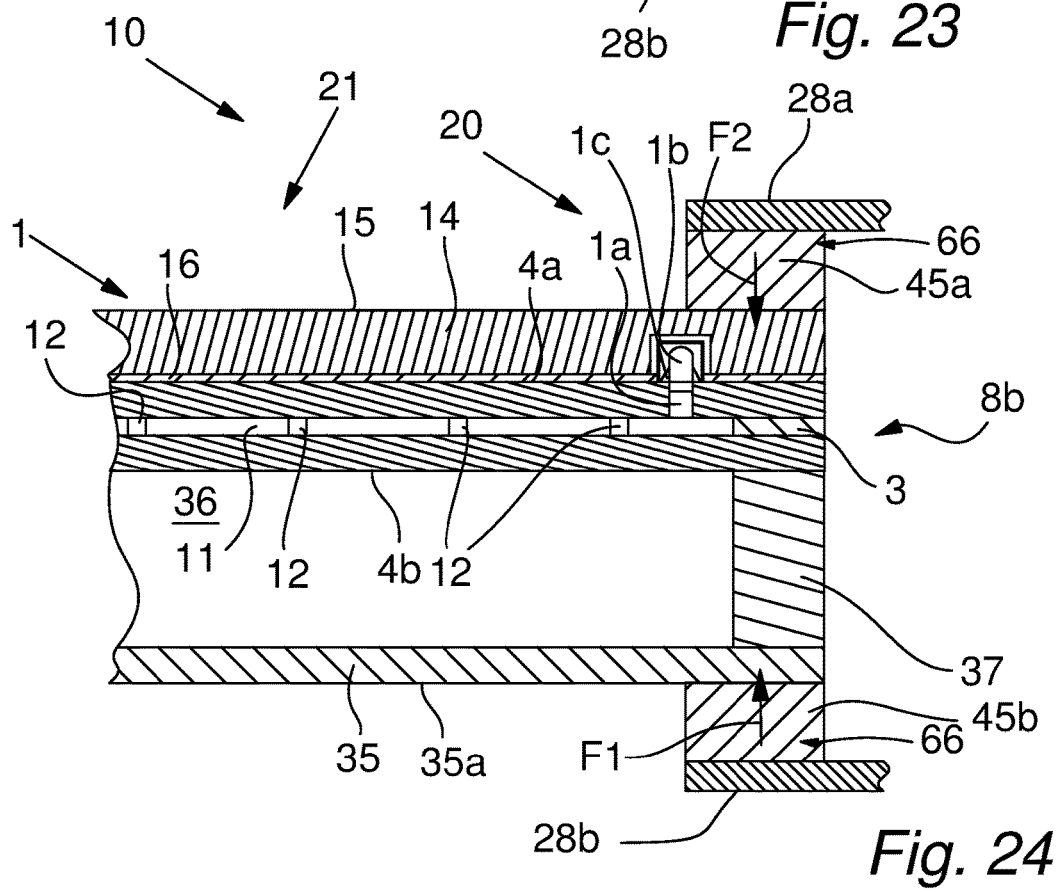

FIG. 24 illustrates an embodiment of the present disclosure where the sealing system 1b, 1c extend into a hole/recess in the lamination glass sheet, and is hence protected by the lamination glass sheet. This hole in the lamination glass sheet may be a through hole or a blind hole as illustrated. This may be provided in a Hybrid VIG solution as described above, or a laminated VIG solution such as described in relation to FIGS. 19, 20 and/or 21.

It is generally to be understood that in further embodiments of the present disclosure, a gasket 50a or 50b to be deflected as e.g. illustrated in one or more of FIG. 8, 8, 18 or 19 may be replaced by a suitable glazing member/profile 23 as described in relation to various further embodiments of the present disclosure. The glazing member 23 may thus be fixed to the frame in the recess 64, and a gasket to be compressed may in further embodiments of the present disclosure be placed between the glazing member 23 and the VIG unit surface, see e.g. one or more of FIGS. 7a-9, 16 and/or 17.

It is generally to be understood that in various embodiments of the present disclosure, one or more of the VIG unit's major surfaces 4a, 4b, 4c, 4d, 15 and/or 35a, 35b may be provided by one or more further layers or coatings providing advantages/features improving or providing optical properties (such as tinted/tinting effects, frosting effects, colouring effects and/or the like), mechanical protection advantages and/or advantages with regard to improving (lowering) the $U_g$-value of the VIG unit (e.g. by means of one or more low-e coatings).

Figure 25:
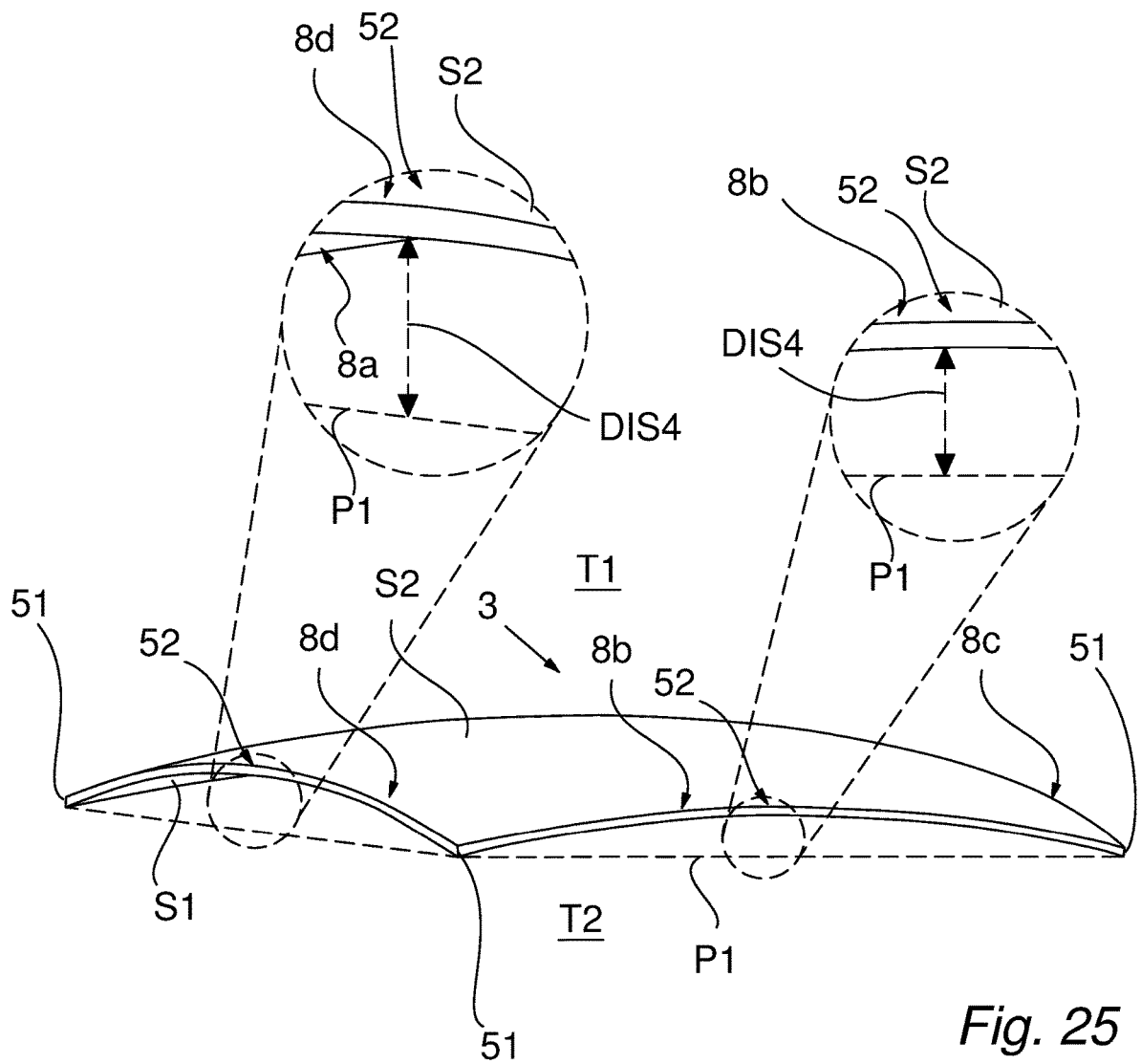

FIG. 25 illustrates a visualized computer simulation of a "free" thermal deflection of a VIG unit 1 used for a frame as disclosed according to embodiments of the present disclosure, which has been provided by one of the present inventors. The VIG unit 1 simulated was based on a VIG unit model defined to have the following characteristics:

Length of shorter edges 8d, 8c: 114 cm
Length of the longer edges: 8a, 8b: 140 cm
Glass sheets 2a, 2b type: Thermally tempered glass sheets each having a thickness of 4 mm.
Lamination glass: annealed float glass of a thickness of 4 mm
Edge seal material: solder glass edge seal material
The VIG is arranged with the surfaces S1, S2 horizontally and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 25.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8b would be 7.82 mm from the plane P1 (DIS4).

Moreover, under these conditions, the simulation results defined that the distance DIS4 from the centre part 52 of the shorter edge 8d would be 5.15 mm from the plane P1.

Figure 26:
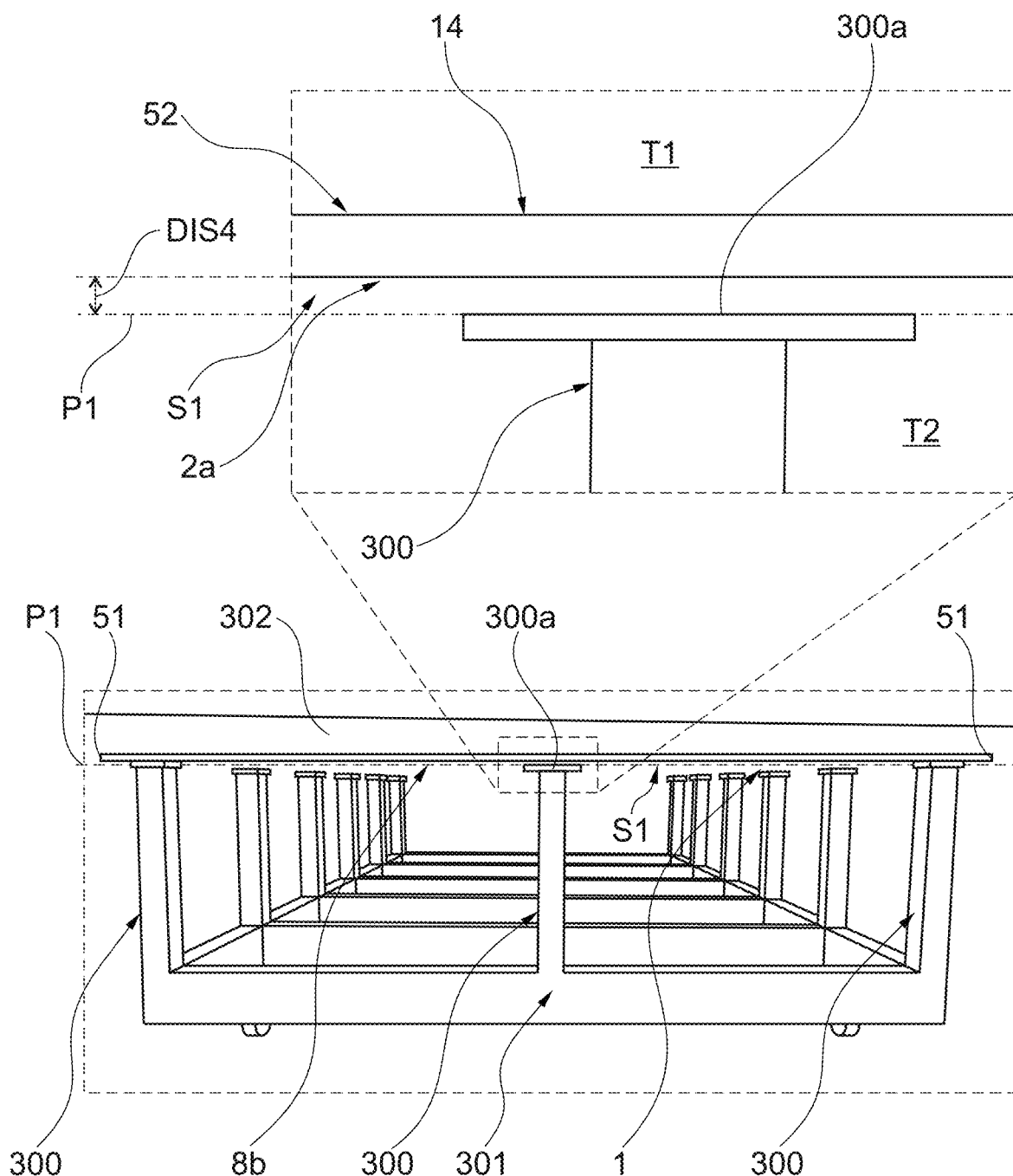
Figure 27:
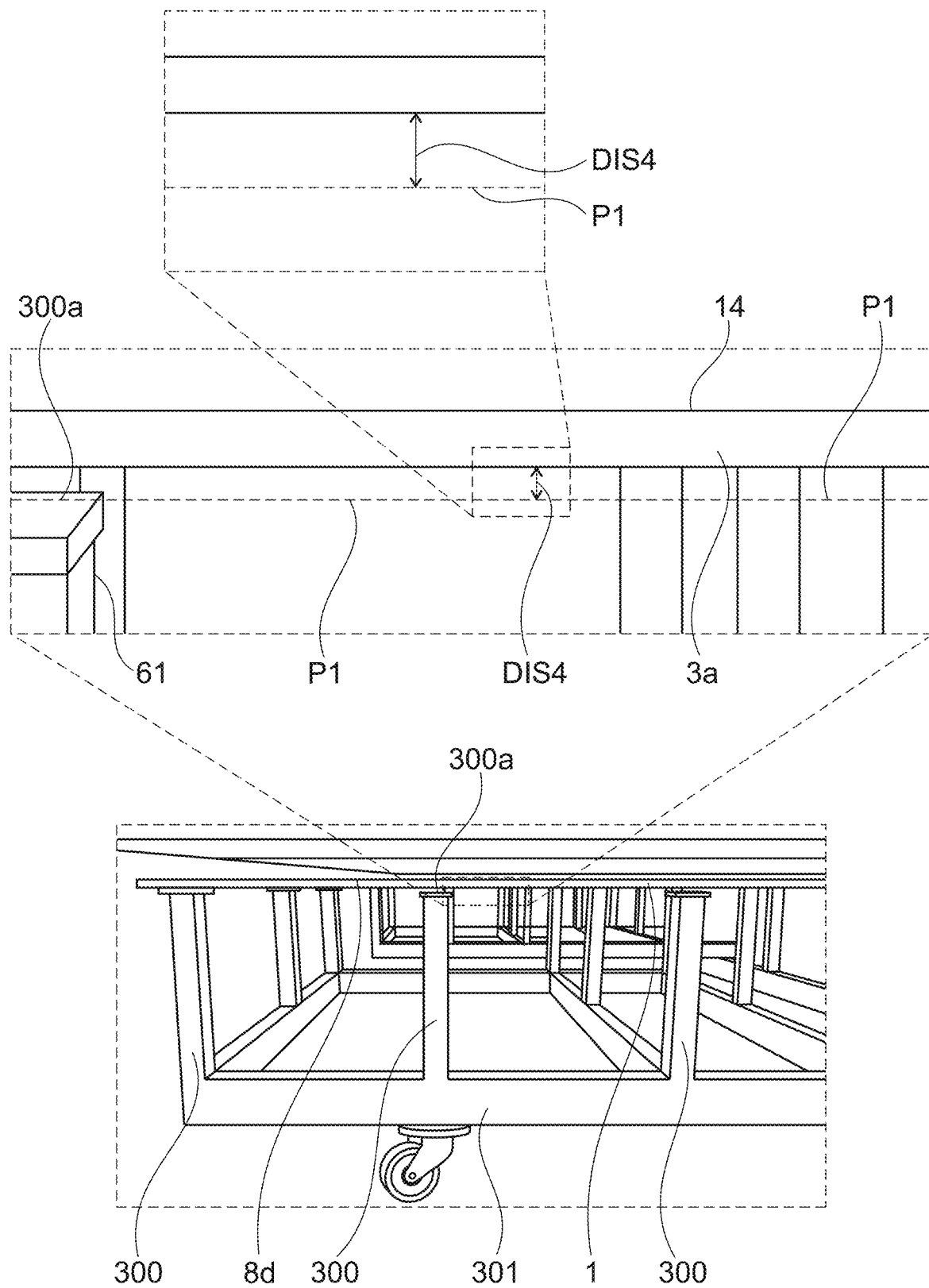

FIGS. 26 and 27 are images of a test of a thermal deflection of a laminated VIG unit 1 having substantially the parameters as defined above with regard to FIG. 25. The VIG unit 1 was placed horizontally to support on support surfaces 300a of a plurality of support rods 300 of a support frame 301. The VIG unit 1 supported initially, when the temperature difference ΔT=T1−T2 was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1−T2, when compared to the temperature difference ΔT=T1−T2 of substantially 0° C.

The distance DIS4 was determined by a first reference point defined by a support surface 300a (that was used as a reference for the plane P1), and the lower surface of the VIG unit 1, in a direction substantially perpendicular to the plane P1.

The maximum edge deflection DIS4 of the long edge 8b (FIG. 26) was measured to be approximately 7.4 mm, or more precisely 7.43 mm at the forced temperature difference, when compared to the temperature difference ΔT=T1−T2 of substantially 0° C.

FIG. 27 illustrates the edge deflection of the shorter edge 8d of the same VIG unit as tested in FIG. 26. Here, in a similar way, the shorter edge 8d described an edge deflection curve DC due to the forced heating and the temperature difference between T1 and T2. Additionally, the maximum edge deflection DIS4 of the shorter edge 8d was measured to be approximately 5.3 mm, or more precisely 5.33 mm, at the forced temperature difference, when compared to the temperature difference $\Delta T=T1-T2$ of substantially 0° C.

Accordingly the maximum tested edge deflection DIS4 vs the simulated edge deflection resulted in the values of table 1 below.

TABLE 1

|  | Simulated edge deflection DIS4 | Edge deflection test (FIGS. 26-27) DIS4 |
|---|---|---|
| Longer edge 8b | 7.82 mm | 7.43 mm |
| Shorter edge 8d | 5.15 mm | 5.33 mm |

The inventors concluded that the test illustrated in FIGS. 26-27 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 5) that causes a substantial edge deflection DIS4 in an un-constricted situation where no "outer" mechanical forces constrains the edge deflection. This applies both in laminated VIG units and, according to simulations, VIG units which are not laminated.

It is understood that the vacuum insulated glass unit frame assembly disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

FIGURE REFERENCES

1: Vacuum insulated glass unit
1a: Evacuation opening in glass sheet for evacuating gap in VIG
1b: Tube such as glass tube arranged in or at evacuation opening for sealing after the evacuation
1c: Sealing system for sealing between tube and glass sheet
2a, 2b: VIG unit glass sheets enclosing evacuated gap
3: Edge seal
4a, 4b: Major, outer surfaces of VIG unit glass sheets enclosing VIG gap.
4c, 4d: Major surfaces of VIG glass sheets facing the evacuated gap
5: Centre portion of VIG edge
6a, 6b: Surface of holding members facing recess
7: Space between neighbouring, discretely arranged suspension elements
8a-8d: Edge of VIG unit
9, 51: VIG corner
10: VIG unit frame assembly such as a window sash.
11: Evacuated gap in VIG unit defined between major surfaces of VIG glass sheets facing the evacuated gap
12: Support structure in VIG unit gap
14: VIG unit lamination glass sheet
15: Outer surface of VIG unit lamination glass sheet
16: Lamination layer.
17: Narrow Edge/surface of lamination glass sheet facing frame
18: Surface of frame
20: Frame arrangement enclosing and holding a VIG unit
20a-20d: Frame profile arrangements.
21: frame opening enclosed by frame profiles.
22: Base member
23: Glazing member
23a: frame surface facing the frame opening
24: Recess in frame into which VIG edge extends
25: Connection between glazing member and base member
26: insulating cavity in frame profile
27: strengthening/reinforcing members in frame profile
28: Frame profile member
28a, 28b: holding members
28c: Wall part connecting support legs/walls
28d: Gasket support member
28e: Sash connection part
29: Space between holding members
30: Fixed building aperture cover frame
35: Glass sheet enclosing gas filled cavity between this glass sheet and the evacuated gap in VIG unit
35a: Outwardly facing surface of glass sheet enclosing gas filled space of hybrid VIG unit
36: Gas-filled space of Hybrid VIG unit
37: Edge seal enclosing gas filled cavity
40: Fixation gasket assembly providing resilient suspension elements
40a-40d: Gasket strip of fixation gasket assembly providing resilient suspension element
44: End wall member of gasket 40
45a, 45b: Resilient suspension elements for fixating VIG unit in frame
47, 48: Adhesive layer
50a, 50b: Resilient sealing or gasket for providing a water tight seal
60a, 60b, 61: Gasket flap/lip
63, 65: connection part of elongated gasket arrangement 64, 76: Gasket receiving recess or groove
66: Space between holding member and VIG unit glass sheet surface
70: sash profile
71: Connection area of sash profile for holding member
72: Sash profile surface
90: Space at VIG edge into which the VIG edge may slide during thermal bending.
100: Retro-fitting system
101: Existing frame/originally designed for insulated glass panes of greater thickness than the VIG unit
102, 103: Wall of existing frame
104: recess in existing frame
DC: Edge deflection curve
T1, T2: Temperature at outer major surface of VIG unit.
F1, F2: holding force
W1: Edge seal width
W2: Width of recess into which the VIG unit extends.
D1, D2: VIG Edge deflection direction
DIS1, DIS2: Deflection distance/length
DIS3: Distance the frame extend in over the VIG unit glass sheet surface(s)
LD: Longitudinal direction LD of VIG unit edge
LD2 L longitudinal direction of holding member
P2: Frame opening plane
P1: VIG unit plane
H3: Uncompressed suspension element height
ΔH1, ΔH2: compression of suspension element by VIG unit

The invention claimed is:

1. A vacuum insulated glass unit frame assembly, wherein said vacuum insulated glass unit frame assembly comprises:
a rectangular vacuum insulated glass unit comprising at least two glass sheets separated by a gap between said glass sheets, wherein a plurality of support structures are distributed in said gap and wherein said gap is sealed, and
a frame comprising elongated frame profile arrangements which frames said vacuum insulated glass unit in a frame opening,
wherein one or more of said frame profile arrangements comprises a holding part, wherein said holding part holds the vacuum insulated glass unit between first and second holding members arranged at opposite outwardly facing surfaces of the vacuum insulated glass unit,
wherein one or more resilient suspension elements is compressed between a first of said holding members and one of said opposite outwardly facing surfaces, and wherein one or more resilient suspension elements is compressed between a second of said holding members and the other of said opposite outwardly facing surfaces,
wherein said compressed, resilient suspension elements provides a holding force towards said opposite outwardly facing surfaces of the vacuum insulated glass unit so as to suspend the vacuum insulated glass unit between said first and second holding members, and
wherein each of said compressed, resilient suspension elements are configured to be further compressed or expand in response to a thermal deflection of the edge of the vacuum insulated glass unit due to a temperature difference between the two glass sheets, so that the further compression is due to a temperature difference having one sign and the expansion is due to a temperature difference of the opposite sign, and
wherein the sum of the compression of said resilient suspension elements perpendicularly to the outwardly facing surfaces of the vacuum insulated glass unit is at least 3 mm at least at one position along an outer circumference of the vacuum insulated glass unit.

2. The vacuum insulated glass unit frame assembly according to claim 1, wherein the magnitude of said thermal deflection is configured to vary along one or more of the vacuum insulated glass unit edges between the corners where the respective edge terminates, due to said temperature difference between the two glass sheets, and
wherein said compression of the resilient suspension elements is configured to vary correspondingly in the longitudinal direction of the respective edge.

3. The vacuum insulated glass unit frame assembly according to claim 1, wherein said resilient suspension elements, has a height of at least 8 mm in an uncompressed state.

4. The vacuum insulated glass unit frame assembly according to claim 1, wherein the compressed, resilient suspension elements arranged at one or both surfaces of said vacuum insulated glass unit, is/are subjected to a compression of at least 2 mm, perpendicularly to the outwardly facing surfaces of the vacuum insulated glass unit at least at one position along an outer circumference of the vacuum insulated glass unit at a temperature difference between the two glass sheets of substantially 0° C.

5. The vacuum insulated glass unit frame assembly according to claim 1, wherein one or both of said resilient suspension elements are elongated gasket strips arranged to extend in a direction parallel to an edge of the vacuum insulated glass unit.

6. The vacuum insulated glass unit frame assembly according to claim 1, wherein said resilient suspension elements comprises a plurality of discrete suspension elements arranged at one or both sides of the vacuum insulated glass unit so as to suspend the vacuum insulated glass unit between said holding members.

7. The vacuum insulated glass unit frame assembly according to claim 1, wherein the distance between said holding members is configured to vary less than 8% when the resilient suspension elements expands or are further compressed by the vacuum insulated glass unit when said temperature difference between the two glass sheets changes.

8. The vacuum insulated glass unit frame assembly according to claim 1, wherein said frame assembly comprises substantially parallel top and bottom frame profile arrangements, and substantially parallel side profile frame arrangements, wherein two, three or all of said top, bottom and/or side profile frame arrangements at least partly encloses said edges, and wherein two or more of said frame profile arrangements comprises one or more of said holding part.

9. The vacuum insulated glass unit frame assembly according to claim 1, wherein the corners and/or the centre portion of the vacuum insulated glass unit's edges are configured to provide said thermal deflection in between and relative to said holding members.

10. The vacuum insulated glass unit frame assembly according to claim 1, wherein said vacuum insulated glass unit is a laminated vacuum insulated glass unit, where a lamination glass sheet is laminated to an outer major surface of a glass sheet of the vacuum insulated glass unit by means of a lamination layer.

11. The vacuum insulated glass unit frame assembly according to claim 1, wherein a further tightening seal or gasket arrangement is arranged so as to seal a space provided between said vacuum insulated glass unit and one of said holding members, and wherein said resilient suspension elements are placed in said space.

12. The vacuum insulated glass unit frame assembly according to claim 1, wherein the largest total edge deflection in a deflection direction of any of the edges of the vacuum insulated glass unit at a temperature difference between the two glass sheets of 65° C. as compared to the vacuum insulated glass unit at a temperature difference of 0° C. is at least 2 mm.

13. The vacuum insulated glass unit frame assembly according to claim 1, wherein the largest total edge deflection of any of the edges of the vacuum insulated glass unit at a temperature difference between the two glass sheets of 65° C. as compared to the vacuum insulated glass unit at a temperature difference of 0° C. is at least 0.3% of the length of the deflecting edge.

14. The vacuum insulated glass unit frame assembly according to claim 1, wherein said vacuum insulated glass unit frame assembly is a building aperture cover.

15. The vacuum insulated glass unit frame assembly according to claim 1, wherein said suspension elements are arranged so as to allow a shift in the direction of the thermal deflection of the corners and/or centre parts of the edges of the vacuum insulated glass unit in response to a change in the temperature difference between the two glass sheets of the vacuum insulated glass unit.

16. The vacuum insulated glass unit frame assembly according to claim 1, wherein a minimum distance is provided between an outer major surface of the vacuum insulated glass unit and walls of said frame, wherein said minimum distance is at least 4 mm at a temperature difference between the two glass sheets of the vacuum insulated glass unit of substantially 0° C.

17. A retrofitting system for retrofitting a vacuum insulated glass unit to a frame originally designed for insulated glass panes, wherein said retro-fitting frame system at least comprises:
  a vacuum insulated glass unit comprising at least two glass sheets separated by a gap between said glass sheets, wherein a plurality of support structures are distributed in said gap and wherein said gap is sealed, and
  a plurality of elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame,
  one or more resilient suspension elements configured to be compressed between a holding member and an outwardly facing surface of the vacuum insulted glass unit, and one or more further resilient suspension elements configured to be compressed between a second holding member and an opposite outwardly facing surface of the vacuum insulted glass unit,
  wherein said resilient suspension elements are configured to provide a holding force towards said opposite outwardly facing surfaces of the vacuum insulated glass unit so as to suspend the vacuum insulated glass unit between said first and second holding members,
  wherein said resilient suspension elements are configured to be further compressed or expand in response to a thermal deflection of the vacuum insulated glass unit due to a temperature difference between the two glass sheets of the vacuum insulated glass unit, so that the further compression is due to a temperature difference having one sign and the expansion is due to a temperature difference of the opposite sign, and
  wherein the sum of the compression of said resilient suspension elements perpendicularly to the outwardly facing surfaces of the vacuum insulated glass unit is at least 3 mm at least at one position along an outer circumference of the vacuum insulated glass unit.

18. A Method of retrofitting a vacuum insulated glass unit to a frame originally designed for insulated glass panes, wherein said method comprises the steps of:
  providing a retrofitting system comprising at least:
  a vacuum insulated glass unit comprising at least two glass sheets separated by a gap between said glass sheets, wherein a plurality of support structures are distributed in said gap and wherein said gap is sealed, and
  a plurality of elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame,
  one or more resilient suspension elements configured to be compressed between a holding member and an outwardly facing surface of the vacuum insulted glass unit, and one or more further resilient suspension elements configured to be compressed between a second holding member and an opposite outwardly facing surface of the vacuum insulted glass unit,
  wherein said resilient suspension elements are configured to provide a holding force towards said opposite outwardly facing surfaces of the vacuum insulated glass unit so as to suspend the vacuum insulated glass unit between said first and second holding members, and
  wherein said resilient suspension elements are configured to be further compressed or expand in response to a thermal deflection of the vacuum insulated glass unit due to a temperature difference between the two glass sheets of the vacuum insulated glass unit, so that the further compression is due to a temperature difference having one sign and the expansion is due to a temperature difference of the opposite sign, and
  wherein the sum of the compression of said resilient suspension elements perpendicularly to the outwardly facing surfaces of the vacuum insulated glass unit is at least 3 mm at least at one position along an outer circumference of the vacuum insulated glass unit,
  the method further comprising the steps of:
  arranging the vacuum insulated glass unit in said frame so that the vacuum insulated glass unit is suspended between the suspension elements of the retro fitting system, and hence fixed to the frame originally designed for insulated glass panes, and
  providing the elongated tightening seals/gasket arrangements of the retro fitting system so that they are arranged to follow a deflection of the vacuum insulated glass unit when it thermally deflect, thereby providing a water tightening and/or air tightening of a space provided between one or more frame profiles members and an outer surface of the vacuum insulated glass unit.

19. The vacuum insulated glass unit frame assembly according to claim 1, wherein the edges of said vacuum insulated glass unit have rigid edge seal provided by fused edge seal material.

* * * * *